(12) United States Patent
Payyappilly et al.

(10) Patent No.: US 9,473,931 B2
(45) Date of Patent: Oct. 18, 2016

(54) METHODS TO ACHIEVE MODEM-ASSISTED-SERVICE-CLASSIFICATION FUNCTIONALITY IN A DEVICE WITH MULTIPLE SUBSCRIPTIONS

(71) Applicant: QUALCOMM Incorporated, San Diego, CA (US)

(72) Inventors: Ajith Tom Payyappilly, San Diego, CA (US); Gerardo Giaretta, La Jolla, CA (US); Sivaramakrishna Veerepalli, San Diego, CA (US); Susheel Kumar Yadav Yadagiri, San Diego, CA (US); Juan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/321,132

(22) Filed: Jul. 1, 2014

(65) Prior Publication Data
US 2015/0026758 A1    Jan. 22, 2015

Related U.S. Application Data

(60) Provisional application No. 61/847,193, filed on Jul. 17, 2013.

(51) Int. Cl.
| | |
|---|---|
| *G06F 17/00* | (2006.01) |
| *H04L 29/06* | (2006.01) |
| *H04W 12/00* | (2009.01) |
| *H04W 4/20* | (2009.01) |

(Continued)

(52) U.S. Cl.
CPC .......... *H04W 12/00* (2013.01); *H04L 41/0893* (2013.01); *H04L 63/02* (2013.01); *H04W 4/00* (2013.01); *H04W 4/20* (2013.01)

(58) Field of Classification Search
CPC ..... H04W 4/04; H04L 63/02; H04L 41/0893
USPC ............................................................ 726/1
See application file for complete search history.

(56) References Cited

U.S. PATENT DOCUMENTS

| | | | |
|---|---|---|---|
| 8,478,320 B2 | 7/2013 | Tofighbakhsh et al. | |
| 8,843,124 B2* | 9/2014 | Fan .................. | H04M 3/42178 455/419 |

(Continued)

OTHER PUBLICATIONS

Hannes Ekström, Ericsson; QoS Control in the 3GPP Evolved Packet System; Year: 2009; IEEE; p. 76-83.*

(Continued)

*Primary Examiner* — Monjour Rahim
(74) *Attorney, Agent, or Firm* — The Marbury Law Group, PLLC

(57) ABSTRACT

Various embodiments provide methods performed by an modem-assisted-service-classification (MASC) client application operating on a multi-SIM computing device for implementing MASC functionality for two or more subscriptions. In various embodiments, the MASC client may implement MASC functionality by associating MASC policies for one or more access point names (APNs) with a specific subscription and by applying those policies to applications associated with those one or more APNs while that specific subscription is in active communication with its network. Thus, by managing a mapping of subscriptions, APNs/networks, and applications, the MASC client may enable implementation of MASC functionality for a multi-SIM computing device.

30 Claims, 22 Drawing Sheets

(51) Int. Cl.
*H04W 4/00* (2009.01)
*H04L 12/24* (2006.01)

(56) References Cited

U.S. PATENT DOCUMENTS

| | | | | |
|---|---|---|---|---|
| 8,863,256 B1* | 10/2014 | Addepalli | ............. | H04W 4/046 |
| | | | | 713/168 |
| 9,204,446 B2* | 12/2015 | Tofighbakhsh | ....... | H04W 48/18 |
| 2009/0061934 A1* | 3/2009 | Hauck | ................... | H04W 8/265 |
| | | | | 455/558 |
| 2009/0286531 A1* | 11/2009 | Bhatt | ................... | H04W 48/18 |
| | | | | 455/426.1 |
| 2010/0120410 A1* | 5/2010 | Fan | ................... | H04M 3/42178 |
| | | | | 455/419 |
| 2010/0128685 A1* | 5/2010 | Jiang | ...................... | H04W 8/12 |
| | | | | 370/329 |
| 2010/0159874 A1* | 6/2010 | Lewis | ............... | H04M 1/72522 |
| | | | | 455/406 |
| 2011/0122818 A1* | 5/2011 | Dwyer | ................ | H04W 76/046 |
| | | | | 370/328 |
| 2011/0294502 A1* | 12/2011 | Oerton | ................. | H04W 4/001 |
| | | | | 455/426.1 |
| 2012/0094685 A1* | 4/2012 | Marsico | ................ | H04W 4/021 |
| | | | | 455/456.1 |
| 2012/0113865 A1 | 5/2012 | Zhao et al. | | |
| 2012/0231802 A1 | 9/2012 | Ngai | | |
| 2013/0059626 A1* | 3/2013 | Hopkins | ............... | H04W 48/18 |
| | | | | 455/552.1 |
| 2013/0077491 A1 | 3/2013 | Cherian et al. | | |
| 2013/0110942 A1* | 5/2013 | Shen | .................... | H04L 51/066 |
| | | | | 709/206 |
| 2013/0111028 A1* | 5/2013 | Kondrad | ............. | H04L 65/1016 |
| | | | | 709/225 |
| 2013/0170351 A1 | 7/2013 | Reznik et al. | | |
| 2013/0223421 A1* | 8/2013 | Gundavelli | ......... | H04W 76/022 |
| | | | | 370/338 |
| 2013/0258984 A1* | 10/2013 | Tofighbakhsh | ....... | H04W 48/18 |
| | | | | 370/329 |
| 2013/0303203 A1* | 11/2013 | Wang | .................... | H04W 68/00 |
| | | | | 455/458 |
| 2013/0308527 A1* | 11/2013 | Chin | .................... | H04W 76/06 |
| | | | | 370/328 |
| 2013/0310108 A1* | 11/2013 | Altman | ................... | H04W 8/08 |
| | | | | 455/552.1 |
| 2013/0329639 A1 | 12/2013 | Wietfeldt et al. | | |
| 2013/0331063 A1* | 12/2013 | Cormier | ............. | H04L 63/0272 |
| | | | | 455/411 |
| 2014/0024339 A1 | 1/2014 | Dabbiere et al. | | |
| 2014/0032733 A1 | 1/2014 | Barton et al. | | |
| 2014/0119292 A1* | 5/2014 | Zhao | .................... | H04W 76/02 |
| | | | | 370/329 |
| 2014/0341041 A1* | 11/2014 | Velev | .................... | H04Q 3/0045 |
| | | | | 370/236 |

OTHER PUBLICATIONS

International Search Report and Written Opinion—PCT/US2014/046718—ISA/EPO—Dec. 4, 2014.
"OMA Device Management Notification Initiated Session; OMA-TS-DM Notification-V1 3-29139422-C", OMA-TS-DM-Notificatiion-v1-3-29139422-C, Open Mobile Alliance (OMAJ, 4339 La Jolla Village Dr., Suite 119 San Diego, CA 92122; USA No. 1.3 Apr. 22, 2013 (Apr. 22, 2013), pp. 1-22, XP064162866, Retrieved from the Internet: URL:ftp/Public documents/DM/DM-DM13/Permanent documents/.
"OMA Device Management Standardized Objects; OMA-TS-DM StdObj-V1 3-20121009-C", OMA-TS-DM-STDOBJ-V1-3-20121009-C, Open Mobile Alliance (OMA), 4330 La Jolla Village Dr., Suite 110 San Diego, CA 92122; USA, No. 1.3 Oct. 9, 2012 (Oct. 9, 2012), pp. 1-31, XP064162875, Retrieved from the Internet: URL:ftp/Public documents/DM/DM-DM13/Permanent documents/.

* cited by examiner

METHODS TO ACHIEVE MODEM-ASSISTED-SERVICE-CLASSIFICATION FUNCTIONALITY IN A DEVICE WITH MULTIPLE SUBSCRIPTIONS

RELATED APPLICATIONS

This application claims the benefit of priority to U.S. Provisional Application No. 61/847,193 entitled "Methods to Achieve Application Traffic Pairing Functionality in a Device with Multiple Subscriptions" filed Jul. 17, 2013, the entire contents of which are hereby incorporated by reference for all purposes.

BACKGROUND

Some new designs of mobile communication devices—such as smart phones, tablet computers, and laptop computers—contain multiple Subscriber Identity Modules (SIM) that provide users with access to multiple separate mobile telephony networks using multiple radio access technologies (RATs). Examples of RATS include GSM, TDSCDMA, CDMA2000, and WCDMA. Example multi-SIM mobile communication devices include mobile phones, laptop computers, smart phones, and other mobile communication devices that are enable to connect to multiple mobile telephony networks.

With the increased sophistication of mobile computing devices and increased bandwidth of cellular networks, service providers are able to offer a very broad range of services beyond supporting voice calls. Consequently, data plans from service providers are becoming increasingly flexible and complex, evolving from the simplistic initial plans of a specified number of minutes of connect time per month, for example, to encompass total bandwidth use and types of services. It is anticipated that service providers will be interested in offering additional types of services and billing plans that are connected to specific applications activated on or registered for use with individual mobile computing devices. However, coordinating services and billing at the application layer will require service providers to have insight into the applications running on communication devices. Currently, service providers can gain such insight through deep packet inspection, which requires significant network processing and has user-privacy implications.

SUMMARY

Various embodiments provide methods, devices, and non-transitory processor-readable storage media for implementing modem-assisted-service-classification (MASC) functionality for a subscription in a multi-Subscriber-Identity-Module (multi-SIM) computing device.

Some embodiment methods may include receiving a signal from an operator network to activate MASC functionality for the subscription for an access point name, obtaining a policy file from the operator network for the access point name, determining whether an application has launched, determining whether the launched application is in the policy file of the access point name in response to determining that an application has launched, and sending a report to the operator network in response to determining that the launched application is in the policy file of the access point name.

In some embodiments, determining whether an application has launched may include determining whether an application that exchanges communications over a wireless network has launched.

In some embodiments, receiving a signal from an operator network to activate MASC functionality for the subscription for an access point name may include receiving a Short Message Service (SMS) message for the subscription from an activation server on the operator network and activating MASC functionality for the subscription for an access point name identified in the SMS message.

Some embodiment methods may include determining whether the SMS message includes Internet Protocol (IP) information for an MASC server in the identified access point name, and acquiring the IP information for the MASC server through a Domain Name System (DNS) query to a DNS server in the identified access point name in response to determining that the SMS message does not include the IP information for the MASC server.

In some embodiments, receiving a signal from an operator network to activate MASC functionality for the subscription for an access point name may include opening a user-datagram-protocol (UDP) listening port for the subscription, receiving a UDP packet for the subscription from an activation server on the operator network, and activating MASC functionality for the subscription for an access point name identified in the UDP packet.

Some embodiment methods may include determining whether the UDP packet includes Internet Protocol (IP) information for an MASC server in the identified access point name and acquiring the IP information through a Domain Name System (DNS) query to a DNS server in the identified access point name in response to determining that the UDP packet does not include IP information for the MASC server.

In some embodiments, obtaining a policy file from the operator network for the access point name may include establishing a connection with an MASC-policy-management server in the access point name and receiving a policy file associated with the access point name and the subscription from the MASC-policy-management server in the access point name.

In some embodiments, the connection with the MASC-policy-management server in the access point name may be one of a hypertext-transfer-protocol (HTTP) connection, an HTTP-secure connection, a file-transfer-protocol (FTP) connection, a trivial-file-transfer-protocol (TFTP) connection, a transmission-control-protocol (TCP) connection, and a UDP connection.

Some embodiment methods may include starting a policy refresh timer associated with the policy file, determining whether to update the policy file, and updating the policy file in response to determining that the policy file should be updated.

Some embodiment methods may include determining that the subscription has lost access to a shared radiofrequency (RF) resource on the multi-SIM computing device, in which the multi-SIM computing device may be a multi-SIM-multi-standby computing device, saving a current state of policy-update operations of the subscription in response to recognizing that the subscription has lost access to the shared RF resource, determining whether the subscription has reacquired the shared RF resource, and resuming the policy-update operations of the subscription from the saved state of policy-update operations in response to determining that the subscription has reacquired the shared RF resource.

In some embodiments, determining whether to update the policy file may include determining whether the policy refresh timer has expired, and updating the policy file in response to determining that the policy file should be updated may include updating the policy file in response to determining that the policy refresh timer has expired.

In some embodiments, updating the policy file in response to determining that the policy file should be updated may include determining whether the subscription has access to a shared radiofrequency (RF) resource on the multi-SIM computing device, in which the multi-SIM computing device may be a multi-SIM-multi-standby computing device, providing access to the shared RF resource to the subscription in response to determining that the subscription does not have access to the shared RF resource, updating the policy file, and returning access to the shared RF resource to another subscription after updating the policy file.

In some embodiments, the multi-SIM computing device may be a multi-SIM-multi-active computing device such that each subscription on the multi-SIM computing device has access to an RF resource for use in updating policy files.

In some embodiments, determining whether to update the policy file may include determining whether an update notification has been received from a MASC policy server in the access point name by listening on one of a UDP port and an SMS port.

In some embodiments, updating the policy file in response to determining that the policy file should be updated may further include determining whether the subscription has access to a shared radiofrequency (RF) resource on the multi-SIM computing device in response to determining that an update notification has been received from a MASC policy server in the access point name, in which the multi-SIM computing device may be a multi-SIM-multi-standby computing device, providing access to the shared RF resource to the subscription in response to determining that the subscription does not have access to the shared RF resource, updating the policy file, and returning access to the shared RF resource to another subscription after updating the policy file.

Some embodiment methods may include determining which subscription is active for the launched application. In some embodiments, determining whether the launched application is in the policy file of the access point name may include determining whether the launched application is in a policy file of an access point name associated with the active subscription, and sending a report to the operator network in response to determining that the launched application is in the policy file of the access point name may include computing a filter report that includes one or more of the launched application's source and destination IP addresses, the launched application's source and destination ports, and a protocol used by the application and computing a hash value for the launched application, in response to determining that the launched application is in a policy file of an access point name associated with the active subscription, establishing a connection with a reporting server in the access point name for the active subscription, and sending a report that includes the filter report and the hash value to the reporting server in the access point name of the active subscription over the connection.

In some embodiments, the connection with the reporting server in the access point name for the active subscription is one of an HTTP connection, an HTTP-secure connection, an FTP connection, a TFTP connection, a TCP connection, and a UDP connection.

Some embodiment methods may include determining whether the launched application has terminated and notifying the reporting server in the access point name of the active subscription of the termination of the launched application in response to determining that the launched application has terminated.

Some embodiment methods may include determining whether the subscription has lost access to a shared radiofrequency (RF) resource on the multi-SIM computing device, wherein the multi-SIM computing device is a multi-SIM-multi-standby computing device, aborting operations to report launched applications to the operator network of the subscription in response to determining that the subscription has lost access to the shared RF resource, determining whether the subscription has reacquired the shared RF resource, and restarting the operations to report launched applications to the operator network of the subscription in response to determining that the subscription has reacquired the shared RF resource.

In some embodiments, the multi-SIM computing device may be a multi-SIM-multi-active computing device such that each subscription on the multi-SIM computing device has access to an RF resource for use in sending a report to the operator network.

Various embodiments may include a mobile communication device configured with processor-executable instructions to perform operations of the methods described above.

Various embodiments may include a mobile communication device having means for performing functions of the operations of the methods described above.

Various embodiments may include non-transitory processor-readable media on which are stored processor-executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
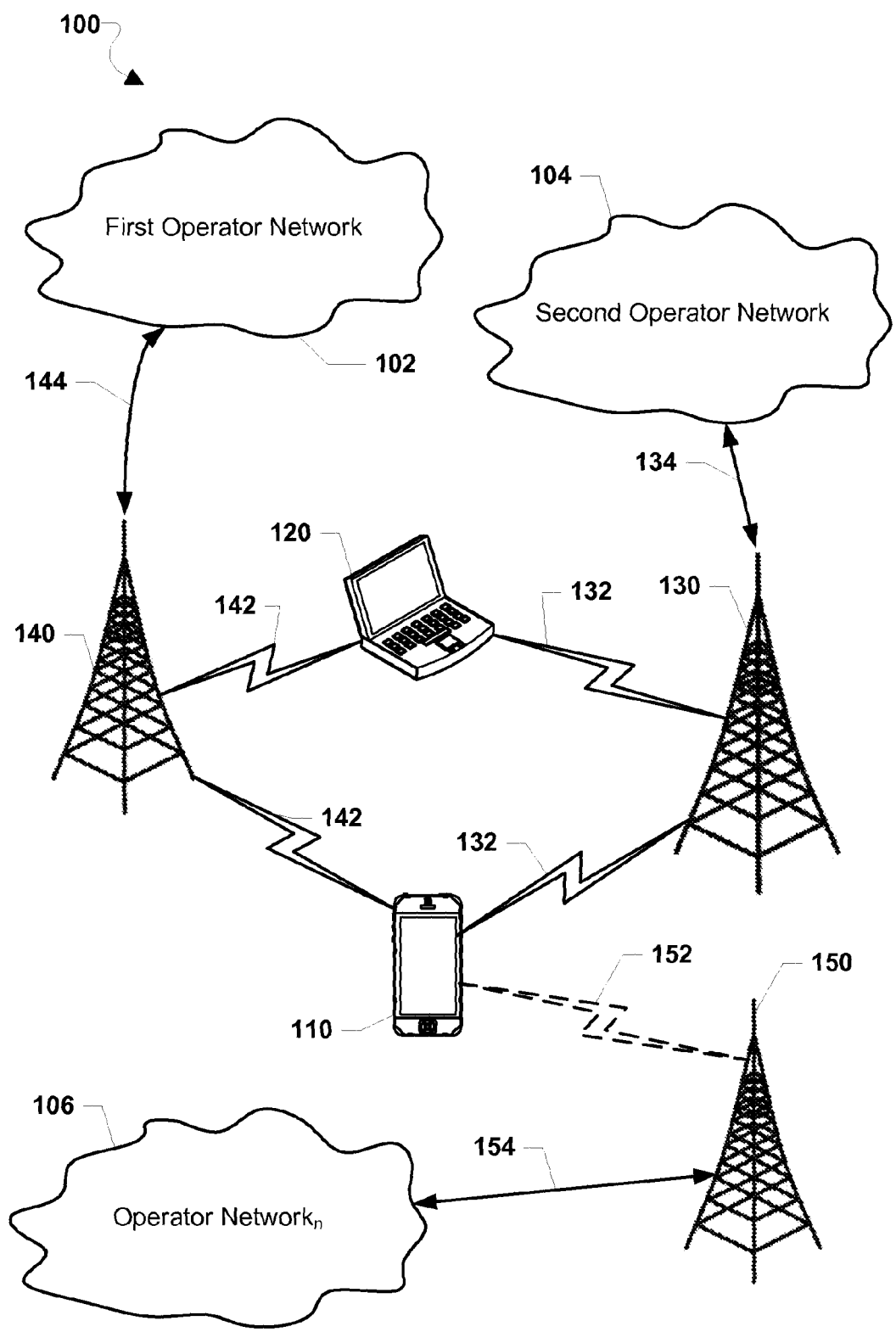
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "mobile computing device" is used herein to refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a dual-SIM-dual-active computing device, that may individually maintain a plurality of subscriptions that utilize a plurality of separate RF resources.

As used herein, a "multi-SIM computing device" is a mobile computing device that includes two or more SIMs that store the international mobile subscriber identity (IMSI) and related information (see, e.g., FIG. 2) used to identify and authenticate subscribers to wireless cellular networks (sometimes referred to herein as "operator networks") so that the multi-SIM computing device can be associated with and use the communication services associated with a user's subscription. Multi-SIM computing devices provide users with more flexibility in terms of services and subscriptions. For example, a multi-SIM computing device may support two different subscriptions (e.g., one voice subscription and one data-only subscription) on one operator network. Also, a multi-SIM computing device may communicate with more than one operator network when the two or more SIMs are associated with subscriptions with different networks. Generally, each SIM supports or enables one subscription with an operator network; so for ease of description, the term "subscription" may be used generally to refer to both the subscribed service and to the SIM that stores the IMSI and keys that enable that service, as well as the operator network providing the subscribed service.

As used herein, a "multi-SIM-multi-active computing device" is a multi-SIM computing device that includes multiple radiofrequency (RF) resources configured so that more than one subscription on the multi-SIM-multi-active computing device may be in communication with its respective operator network simultaneously.

As used herein, a "multi-SIM-multi-standby computing device" is a multi-SIM computing device that includes one or more RF resources that are shared among two or more subscriptions on the multi-SIM-multi-standby computing device (i.e., there are more subscriptions than RF resources). Thus, in a multi-SIM-multi-standby computing device, some subscriptions may need to wait for an available RF resource before communicating with its respective operator network.

Modem-assisted service classification (MASC) is a new framework and protocol currently in development that enables service providers to offer communication services and data plans linked to specific applications executing on mobile computing devices without the need for performing deep packet inspection within the network. Generally, MASC provides a framework in which mobile computing devices provide the operator network with information regarding applications executing on the device so that a network server (referred to herein as an MASC server) can selectively allow certain applications on a user's mobile computing device to access network resources while denying access to other applications. Such a framework, which is referred to herein generally as "MASC functionality" or, sometimes, as "Application-Traffic-Pair" (ATP) functionality, may enable or improve current implementations of application-specific data plans. For example, a user may choose a cheaper or subsidized data plan that only allows particular applications to access the Internet rather than a general data plan that allows any application access to the Internet. In another example, the user may have a basic data plan that allows usage of all applications except certain specific applications (presumably ones that require much bandwidth), and if those applications are activated, the user is billed extra over the basic fee. Thus, MASC may allow users, service/content providers, or both the ability to pair only certain applications on a mobile computing device with the user's data plan subscription.

In some implementations of MASC functionality, a user's mobile computing device may share information regarding its applications connecting to at least one access point name (APN) in the operator network to which the user's mobile computing device is subscribed, with MASC servers located in that APN. The operator network may include one or more APNs, and each APN may be associated with certain applications.

In some implementations of MASC functionality, each APN in the operator network may include one or more task-specific MASC servers. For example, the APN may include an MASC policy server that maintains a record of the applications associated with the APN that may access network resources or run on the user's mobile computing device given the user's current data plan (i.e., subscription). The APN may also include an MASC reporting server that receives communications from the user's mobile computing device regarding applications' activity (e.g., application launches and terminations) and filter information for communication over the network (e.g., source, destination IP address, port numbers, etc.). The APN may also include an MASC activation server for activating MASC functionality on the user's mobile computing device for that particular operator network based on the user's data plan subscription.

In some implementations of MASC, when the user launches an application, the user's mobile computing device may send information about the launched application (e.g., such as filter information) to an MASC reporting server in the operator network, and the operator network may use this information to check whether the application is in the user's data plan. The operator network may then allow the application's traffic when the application is in the user's data plan or subscription, but deny network access to the application's traffic or take some other action (e.g., notify the user, or bill extra) when the application is not in the user's data plan.

Multi-SIM mobile computing devices pose a unique challenge for MASC functionality due to their ability to support multiple subscriptions to one or more networks, each of which may implement different application-specific data plans and policies. For example, a multi-SIM mobile computing device subscribed to two different services could have one subscription that applies a policy to certain applications running on the device and another subscription that applies a different policy to other applications or that does not implement an application-specific policy. If the multi-SIM mobile computing device reports all applications running on the device to a network as part of the MASC functionality, this could result in a misapplication of a policy by the operator network. On the other hand, if the multi-SIM mobile computing device mistakenly fails to report filter information pertinent to an active subscription, this could prevent that operator network from implementing the appropriate application-specific data plans and policies. This challenge may be more difficult when two or more subscriptions are connected to their respective networks simultaneously, and thus potentially active at the same time.

Some conventional mobile computing devices maintain various associations between applications, RF resources, subscriptions, and APNs, but currently, these associations are only used to select a particular RAT or radio to utilize for a particular application executing on the devices or to determine the mobile networks from which the devices may receive service, for example, based on the APNs that are currently enabled or disabled. However, such conventional devices are unrelated to the problems of managing application traffic on a multi-SIM computing device after a connection to a mobile network is established.

In overview, various embodiments implemented on a multi-SIM computing device provide methods performed by a processor executing an MASC client for implementing MASC functionality for two or more subscriptions on the multi-SIM computing device. In various embodiments, the device processor executing the MASC client may implement MASC functionality by associating MASC policies for one or more APNs with a specific subscription, and by applying those policies to applications associated with those one or more APNs while that specific subscription is in active communication with its network. Thus, by managing a mapping of subscriptions, APNs/networks, and applications, the device processor executing the MASC client may enable implementation of MASC functionality for the multi-SIM computing device.

In various embodiments, the device processor executing the MASC client may implement MASC functionality on the multi-SIM computing device by activating MASC functionality for a subscription, obtaining a policy file from one or more APNs in the subscription's network, and communicating filter information of an application that launches while the subscription is active in the event that the application is in a policy file received from an APN associated with the application and the subscription.

In some embodiments, the various instances in which the processor executing the MASC client attempts to connect to a subscription's server may fail for various reasons. In this case, the processor executing the MASC client may implement various failure handling techniques, such as waiting for a certain amount of time before making subsequent attempt to connect to the network.

Various embodiments may be implemented within a variety of communication systems 100 that include at least two mobile telephony networks, an example of which is illustrated in FIG. 1. Operator networks 102, 104, 106 typically each include a plurality of cellular base stations (e.g., a first base station 130, a second base station 140, and a third base station 150).

A first multi-SIM computing device 110 may be in communication with the first operator network 102 through a cellular connection 132 to the first base station 130. The first multi-SIM computing device 110 may also be in communication with the second operator network 104 through a cellular connection 142 to the second base station 140. The first base station 130 may be in communication with the first operator network 102 over a wired connection 134. The second base station 140 may be in communication with the second operator network 104 over a wired connection 144.

A second multi-SIM computing device 120 may similarly communicate with the first operator network 102 through the cellular connection 132 to the first base station 130. The second multi-SIM computing device 120 may communicate with the second operator network 104 through the cellular connection 142 to the second base station 140.

In some embodiments, the first multi-SIM computing device 110 may optionally connect to an arbitrary number of other operator networks. For example, the first multi-SIM computing device 110 may optionally connect to a third operator network 106 through an optional cellular connection 152 to the third base station 150, which may connect to the third operator network 106 through a wired connection 154.

In some embodiments (not illustrated), the second multi-SIM computing device 120 may connect to the third operator network 106 in a similar manner as it is anticipated that any multi-SIM computing device may connect to an arbitrary number of operator networks.

The cellular connections 132, 142, 152 may be made through two-way wireless communication links, such as 4G, 3G, CDMA, TDMA, WCDMA, GSM, and other mobile telephony communication technologies.

Figure 2:
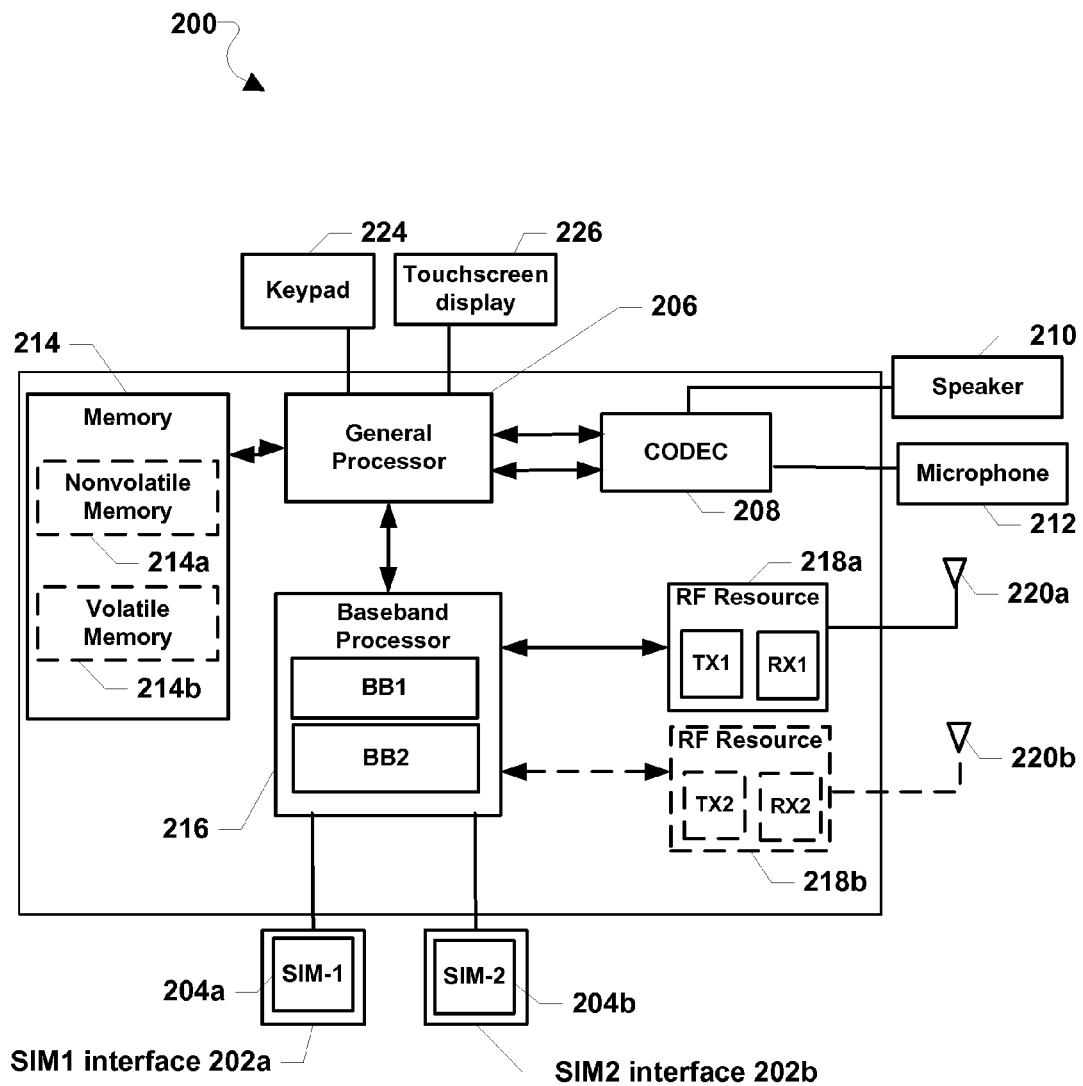
FIG. 2 is a component block diagram of a multi-SIM communication device according to various embodiments.

FIG. 2 is a functional block diagram of a multi-SIM computing device 200 suitable for implementing various embodiments. According to various embodiments, the multi-SIM computing device 200 may be similar to one or more of the multi-SIM computing devices 110, 120 as described with reference to FIG. 1. With reference to FIGS. 1-2, the multi-SIM computing device 200 may include a first SIM interface 202a, which may receive a first identity module SIM-1 204a that is associated with a first subscription. The multi-SIM computing device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS and/or LTE networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the multi-SIM computing device 200 (e.g., memory 214), and thus need not be a separate or removable circuit, chip or card.

The multi-SIM computing device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain. In some embodiments, the memory 214 may include nonvolatile memory 214a and/or volatile memory 214b.

The memory 214 may store an operating system (OS), as well as user application software and executable instructions. The memory 214 may also store application data, such as an array data structure. In some embodiments, the memory 214 may also store one or more look-up tables, lists, or various other data structures for use with various embodiments.

The general processor 206 and the memory 214 may each be coupled to at least one baseband modem processor 216. Each SIM in the multi-SIM computing device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a radio access technology (RAT), and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the multi-SIM computing device 200). In other embodiments, each baseband-RF resource chain may include physically or logically separate baseband processors (e.g., BB1, BB2).

In some embodiments, the RF resources 218a, 218b may be associated with different SIMs/subscriptions. For example, a first subscription to a WCDMA network may be associated with the RF resource 218a, and a second subscription to a GSM network may be associated with the RF resource 218b. The RF resources 218a, 218b may each be transceivers that perform transmit/receive functions on behalf of their respective subscriptions/SIMs. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the multi-SIM computing device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the multi-SIM computing device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the multi-SIM computing device 200 to enable communication between them, as is known in the art.

Functioning together, the two SIMs 204a, 204b, the baseband modem processor 216, the RF resources 218a, 218b, and the wireless antennas 220a, 220b may constitute two or more radio access technologies ("RATs"). For example, a SIM, baseband processor and RF resource may be configured to support a GSM RAT and/or a WCDMA RAT. More RATs may be supported on the multi-SIM computing device 200 by adding more SIM cards, SIM interfaces, RF resources, and/or antennae for connecting to additional mobile networks.

Figure 3:
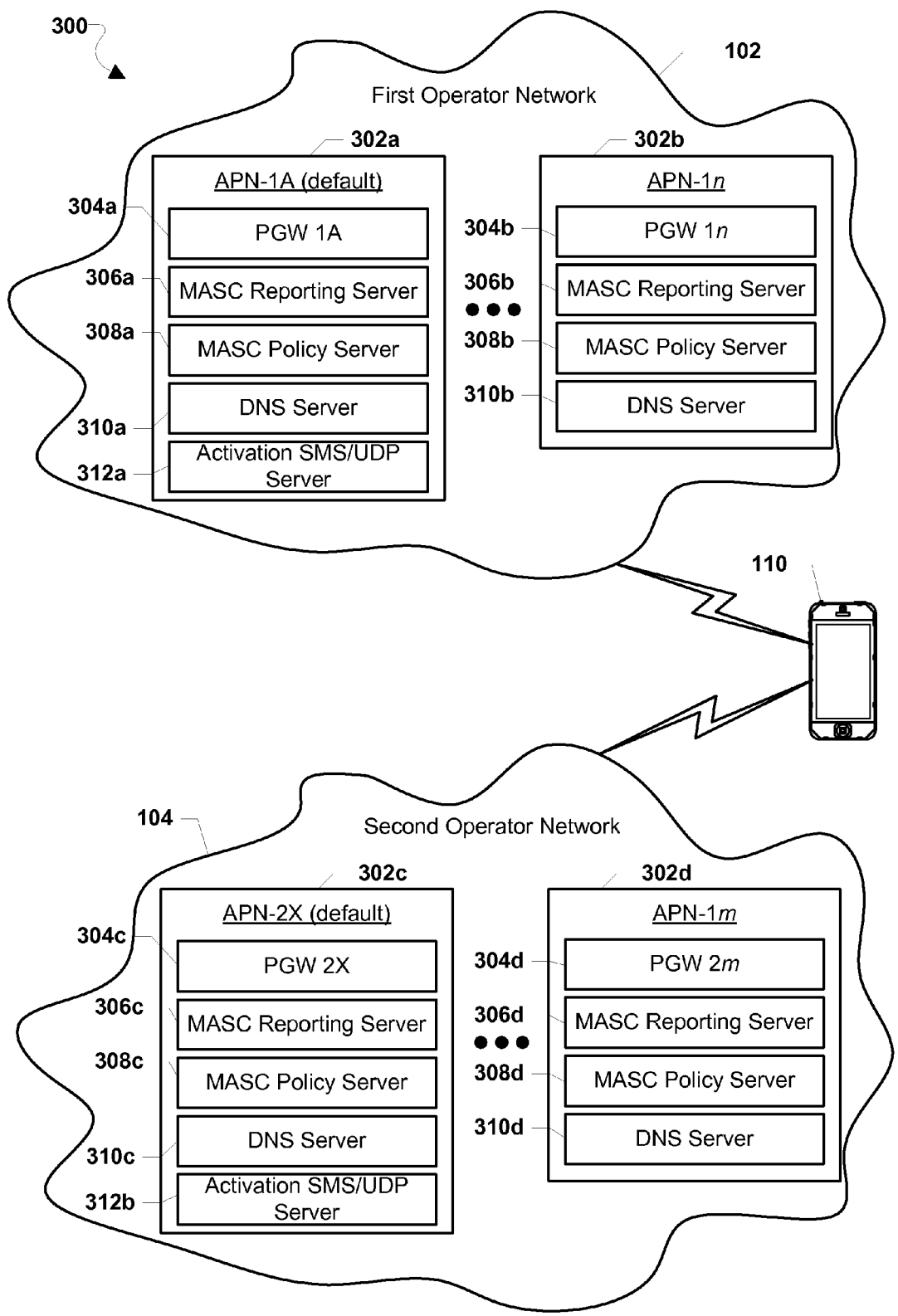
FIG. 3 is a component block diagram of operator networks for implementing computing-device centered Modem-Assisted-Service-Classification (MASC) functionality according to various embodiments.

As discussed, a plurality of subscriptions on a multi-SIM computing device may communicate with one or more operator networks. FIG. 3 illustrates a block system diagram 300 of components in the operator networks 102, 104 described above with reference to FIG. 1 according to various embodiments.

With reference to FIGS. 1-3, the first operator network 102 and the second operator network 104 may include at least one access point name (APN). An APN may identify the packet data network (PDN) with which a mobile computing device (e.g., 110) or a particular subscription on a multi-SIM computing device desires communication. Thus, in some embodiments, each of the one or more APNs included in the operator networks 102, 104 may function as a gateway between a subscription on the multi-SIM computing device 110 and another network, such as the Internet.

In some embodiments, the operator networks 102, 104 may include a first/default APN (e.g., APN-1A 302a and APN-2X 302c) and an arbitrary number of additional APNs (e.g., APN-1n 302b and APN-1m 302d). In some embodiments, a subscription's first communication with the APNs in an operator network may be with the default APN. For example, a first subscription on the multi-SIM computing device 110 may initially communicate with the APN-1A 302a in the first operator network 102, and a second subscription on the multi-SIM computing device 110 may initially communicate with the APN-2X 302c in the second operator network 104.

In some embodiments, the APN-1A 302a and the APN-2X 302c may include an activation server (e.g., Activation SMS/User Datagram Protocol (UDP) Servers 312a, 312b) that may send an activation signal for a specific subscription (sometimes referred to herein as a "recipient subscription") to the multi-SIM computing device 110. In some embodiments, a device processor executing an MASC client on the multi-SIM computing device 110 may receive the activation signal and activate MASC functionality for the recipient subscription. The activation signal may be in the form of a Short Message Service (SMS) message or as a UDP packet. While not illustrated, in some embodiments, APNs other than default APNs (e.g., the APN-1A 302a and the APN-2X 302c) may also include activation servers to activate each APN for the subscription individually.

In some embodiments, each of the APNs 302a-302d may include various specialized servers to which a device processor executing an MASC client on the multi-SIM computing device 110 may communicate in order to implement MASC functionality for each subscription that has received an activation signal (sometimes referred to herein as an "MASC-activated subscription"). The APNs 302a-302d may include a packet-data-network or "PDN" gateway (e.g., PGW 1A 304a, PGW 1n 304b, PGW 2X 304c, and PGW 2m 304d). The PDN gateways may provide connectivity for the subscriptions of the multi-SIM computing device 110 to external packet data networks and may serve as gateways for the subscriptions' traffic.

The APNs 302a-302d may individually include an MASC reporting server (e.g., MASC reporting servers 306a-306d) and an MASC policy server (e.g., MASC policy servers 308a-308d). The MASC reporting servers 306-306d may each receive information about the applications operating on the multi-SIM computing device 110 from the device processor executing the MASC client. The MASC policy servers 308a-308d may provide information to the device processor executing the MASC client regarding applications that are authorized to access network resources through the APNs of the respective MASC policy servers 308a-308d.

In some embodiments, the APNs 302a-302d may also include domain name system (DNS) servers (e.g., DNS servers 310a-310d) for resolving DNS queries regarding location information for the various servers included in the APNs 302a-302d.

Figure 4:
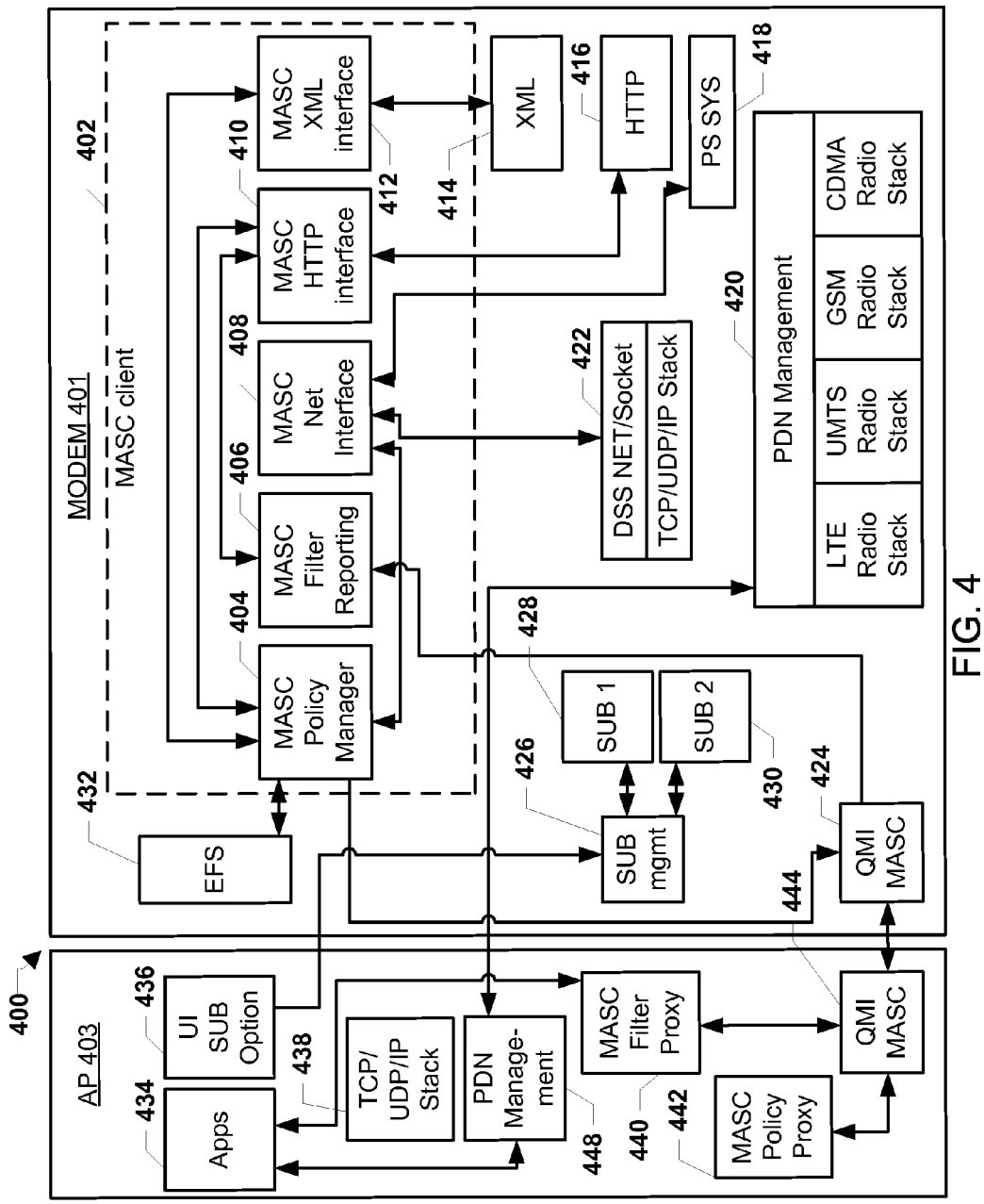
FIG. 4 is a component block diagram of a multi-SIM computing device configured to implement MASC functionality according to various embodiments.

FIG. 4 illustrates a functional block diagram of a multi-SIM computing device 400 configured to implement MASC functionality for a plurality of subscriptions. According to some embodiments, the multi-SIM computing device 400 may be similar to one or more of the multi-SIM computing devices 110, 120, 200 as described with reference to FIG. 1-3. With reference to FIGS. 1-4, the multi-SIM computing device 400 may include various components implemented in software and/or hardware. For example, these components may include software modules, processors (e.g., central processing units, digital signal processors, etc.), specialized hardware circuits, etc. (see, e.g., FIG. 2). In some embodiments, a processor (e.g., the general processor 206 or the like) executing an MASC client operating on the multi-SIM computing device 400 may include or rely on one or more of these components to implement MASC functionality for one or more subscriptions on the multi-SIM computing device 400.

In some embodiments, the multi-SIM computing device 400 may include a modem processor 401 (e.g., the general processor 206 or the baseband modem processor 216 of FIG. 2) that is configured to include and/or execute an MASC client 402. The MASC client 402 may include an MASC policy manager 404 for communicating with an MASC policy server, an MASC-filter-reporting component 406 for communicating with an MASC reporting server, an MASC net interface 408, an MASC hypertext-transfer-protocol (HTTP) interface 410 for communicating through an HTTP protocol 416, and an MASC extensible-markup-language (XML) interface 412 for communicating through an XML protocol 414. The various components included in the MASC client 402 may be in communication with one or more other components in the MASC client 402. In some embodiments, the various components in the MASC client 402 may be used to activate and implement MASC functionality. While an HTTP protocol 416 is illustrated, in some embodiments (not shown), the multi-SIM computing device 400 may include one or more other components that may enable the multi-SIM computing device 400 to establish an HTTP connection, an HTTP-secure ("HTTPS") connection, a file-transfer-protocol (FTP) connection, a trivial-FTP (TFTP) connection, or transmission-control-protocol (TCP) connection, a UDP connection, and/or any other protocol that may be used to download a file or to send/receive information via a wireless network.

In some embodiments, the MASC policy manager 404 may be in communication with an encrypting file system (EFS) 432 and a component for interfacing with the MASC client (i.e., a first modem-interface (QMI) component 424), and the first QMI component 424 may also be in communication with the MASC-filter-reporting component 406. The first QMI component 424 may also be in communication with a second QMI component 444 included in an application processor 403 (labeled in FIG. 4 as "AP").

In some embodiments, the MASC net interface 408 may be in communication with a data-services-sockets-interface (DSS) net/socket and/or a transport-control-protocol (TCP)/UDP/Internet Protocol (IP) Stack (e.g., TCP/UDP/IP stack 422). The MASC net interface 408 may also be in communication with a protocol systems (PS SYS) 418.

The application processor 403 may be configured with processor-executable instructions to implement various applications (e.g., Apps 434), a user-interface-subscription-option component to enable the user to change the subscription that is currently active (i.e., UI SUB option 436), a TCP/UDP/IP stack 438, a PDN management component 448, an MASC filter proxy 440, and an MASC policy proxy 442. Apps 434 may be in communication with the PDN management component 448 and the MASC filter proxy 440. The UI SUB option 436 may be in communication with a subscription management unit 426 included in the modem processor 401, which in turn may be in communication with one or more subscriptions (e.g., a first subscription 428 and a second subscription 430). The MASC filter proxy 440 may be in communication with the QMI component 444, which may be in communication with the MASC policy proxy 442.

Figure 5:
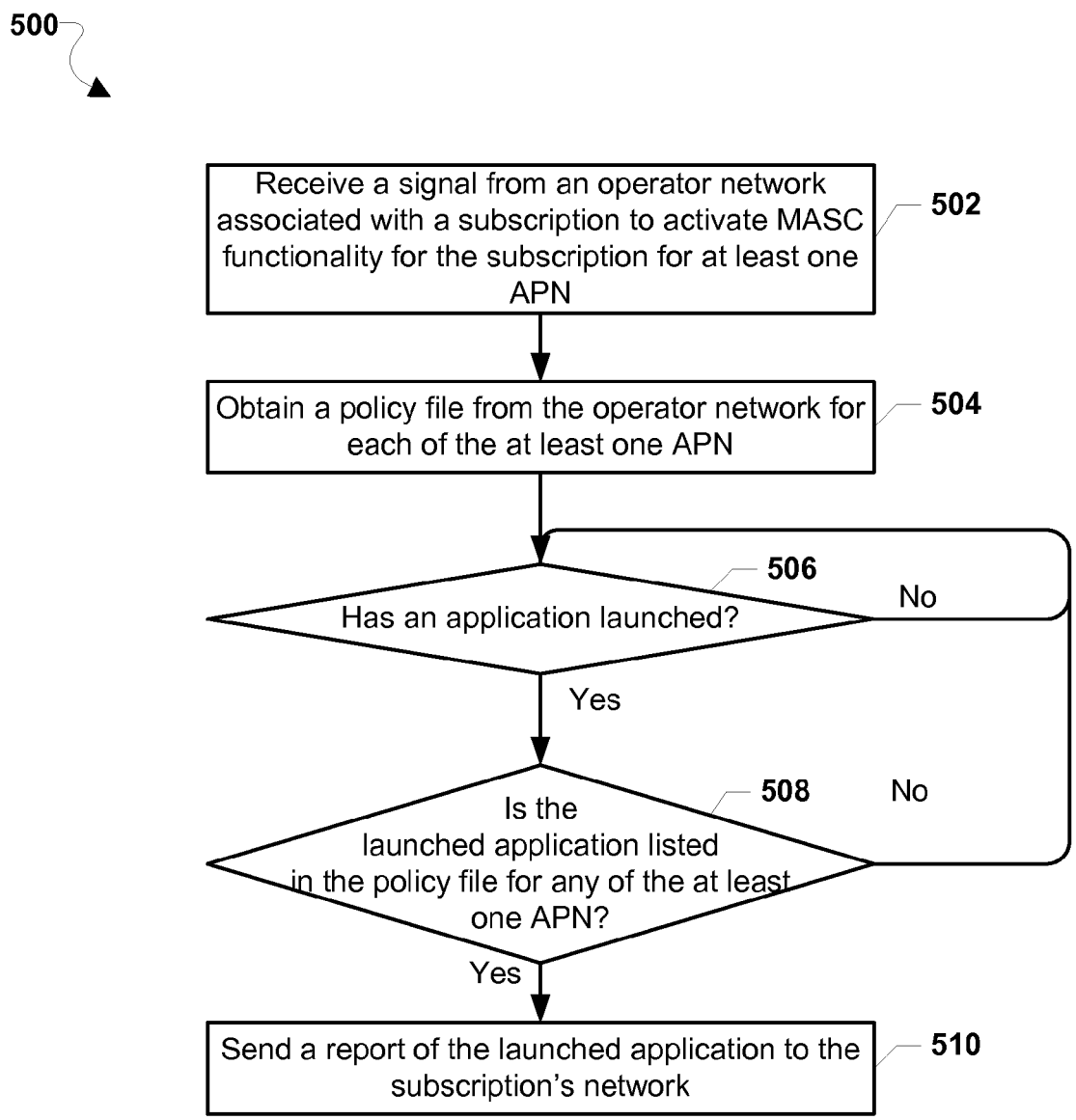
FIG. 5 is a process flow diagram illustrating a method of activating and implementing MASC functionality on a multi-SIM computing device according to various embodiments.

FIG. 5 illustrates an embodiment method 500 that may be implemented with a processor (e.g., the general processor 206 and/or the baseband modem processor 216 of FIG. 2 and/or the modem processor 401 of FIG. 4) executing an MASC client on a multi-SIM computing device (e.g., the multi-SIM computing devices 110, 120, 200, 400 of FIGS. 1-4) for implementing MASC functionality for one or more subscriptions on the multi-SIM computing device.

With reference to FIGS. 1-5, in block 502, the processor executing the MASC client may receive a signal from an operator network associated with a subscription to activate MASC functionality for the subscription for at least one APN. In some embodiments, the processor executing the MASC client may monitor an active communication link with an operator network for activation signals for a subscription on the multi-SIM computing device and may activate MASC functionality for that subscription upon receiving an activation signal. In some embodiments, the processor executing the MASC client may be in a dormant or "listening" configuration for a subscription until the MASC client receives a signal indicating the beginning of MASC activity for that subscription. Further, the processor executing the MASC client may activate MASC functionality in various other ways (see, e.g., FIGS. 6-11).

In block 504, the processor executing the MASC client may obtain a policy file from the subscription's network for each of the at least one APN. In some embodiments, the policy file may include a list of applications that are authorized to run on the multi-SIM computing device while the subscription is active. For example, certain applications on the multi-SIM computing device may be "registered" with an MASC server in the subscription's network, and those applications may be included in the policy file of MASC server as part of the registration process. The processor may obtain a policy file from the subscription's network by performing various methods and/or operations (see, e.g., FIGS. 12-16).

In determination block 506, the processor executing the MASC client may determine whether an application has been launched, and the processor executing the MASC client may repeat the operations in determination block 506 in a loop so long as no application launch is detected (i.e., while determination block 506="No"). In some embodiments, the launched application, the processor operating on the multi-SIM computing device, or another component may signal the MASC client that the application has launched.

In some embodiments of the operations performed in determination block 506, the device processor executing the MASC client may only monitor for application launches for applications that need to communicate with a wireless network and/or that needs to transfer data to and from a peer or server over a network. In other words, instead of monitoring for the launch of any application, the device processor executing the MASC client may only monitor for applications that require network access and that may benefit from MASC functionality. For example, the device processor executing the MASC client may monitor for the launch of a social-media application that communicates with a server over a network and may ignore the launch of another application that does not have network-communication capabilities.

In response to determining that an application has launched (i.e., determination block 506="Yes"), the processor executing the MASC client may determine whether the launched application is listed in the subscription's policy file for an APN, in determination block 508. In some embodiments, the processor executing the MASC client may reference the application's name. In some embodiments, the processor executing the MASC client may determine whether a class or class of applications to which the launched application belongs—or a parent application associated with the launched application—is listed in the subscription's policy file for an APN. In such embodiments, the processor executing the MASC client may utilize the subscription's policy file to differentiate an application based on its general characteristics or capabilities instead of by its name or identification.

In response to determining that the application is not listed in the subscription's policy file (i.e., determination block 508="No"), the processor executing the MASC client may repeat the operations in determination block 506 by determining whether another application has launched. In some embodiments, an application not included in the subscription's policy file may not be authorized to access network resources, and thus, the processor executing the MASC client may ignore a launched application not included in the subscription's policy file for an APN.

In response to determining that the launched application is listed in the subscription's policy file (i.e., determination block 508="Yes"), the processor may send a report of the launched application to the subscription's network. In some embodiments, the processor executing the MASC client may send the report to an MASC server that serves as a gatekeeper, determining whether to allow an application to access network resources.

In some embodiments, the processor executing the MASC client may send to the MASC server, among other things, filter reports that include a computed hash value for the launched application and/or an indication that the launched application has terminated (see, e.g., FIGS. 17-20).

While the above description only describes implementing MASC functionality on one subscription, in some embodiments, the processor executing the MASC client may simultaneously or near-simultaneously implement MASC functionality for multiple subscriptions on the multi-SIM computing device.

Figure 15A:
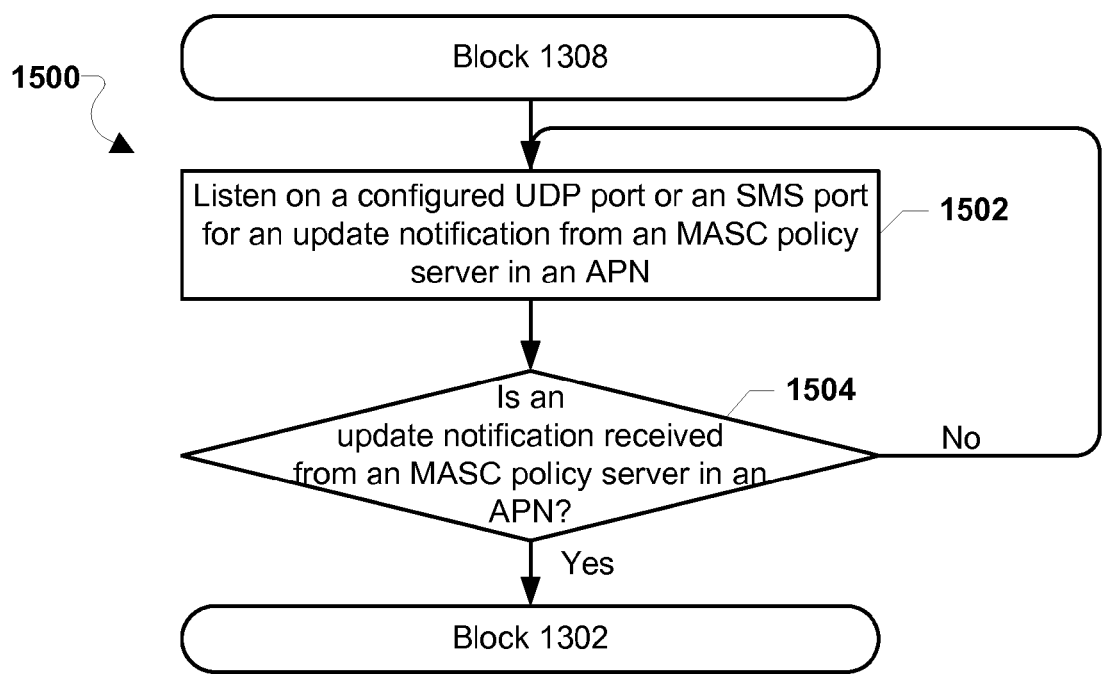
FIG. 15A is a process flow diagram illustrating a method of updating a policy file in response to receiving an update notification from an APN according to various embodiments.
Figure 15B:
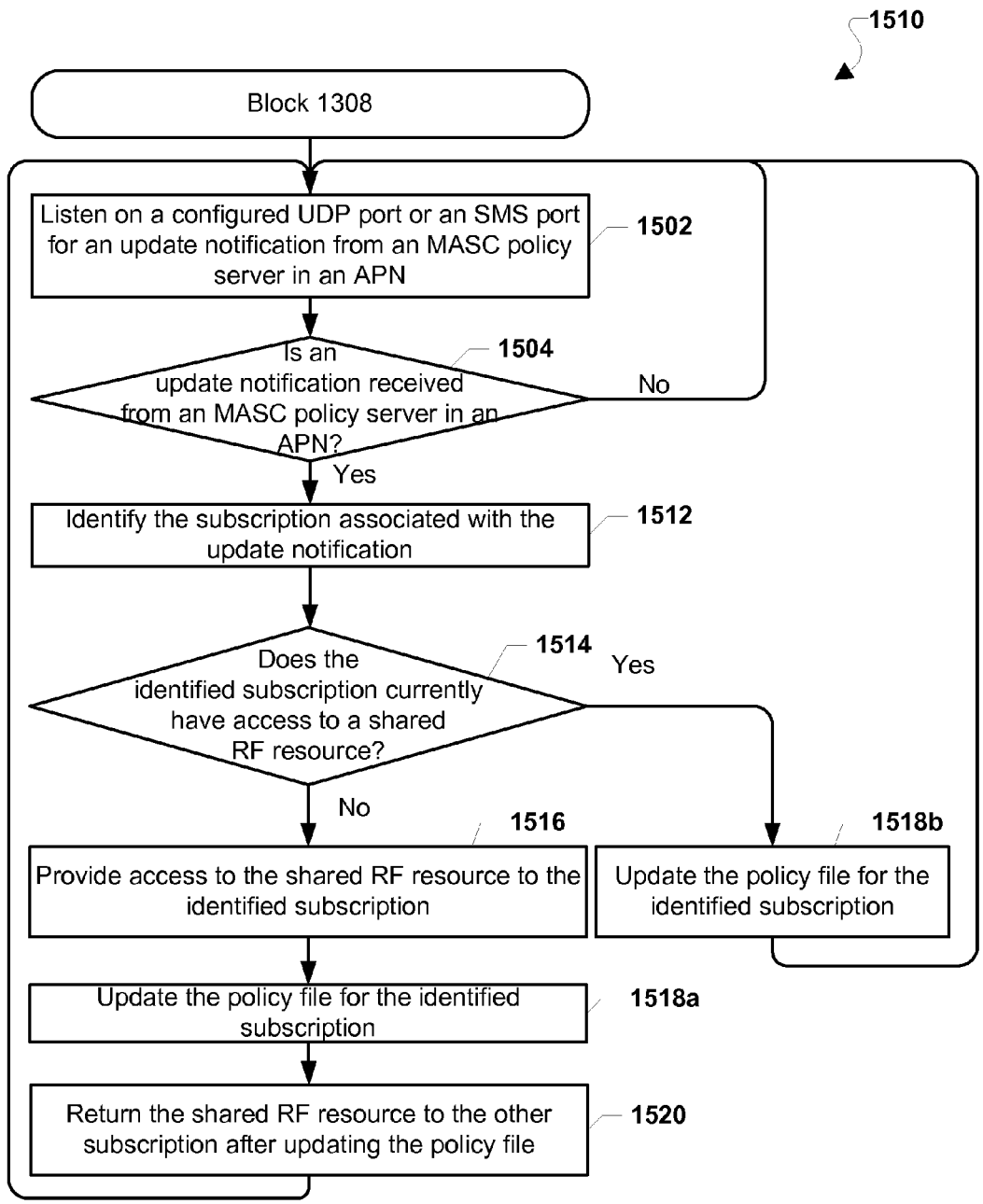
FIG. 15B is a process flow diagram illustrating a method of updating a policy file on a multi-SIM-multi-standby computing device in response to receiving an update notification from an APN according to various embodiments.
Figure 16:
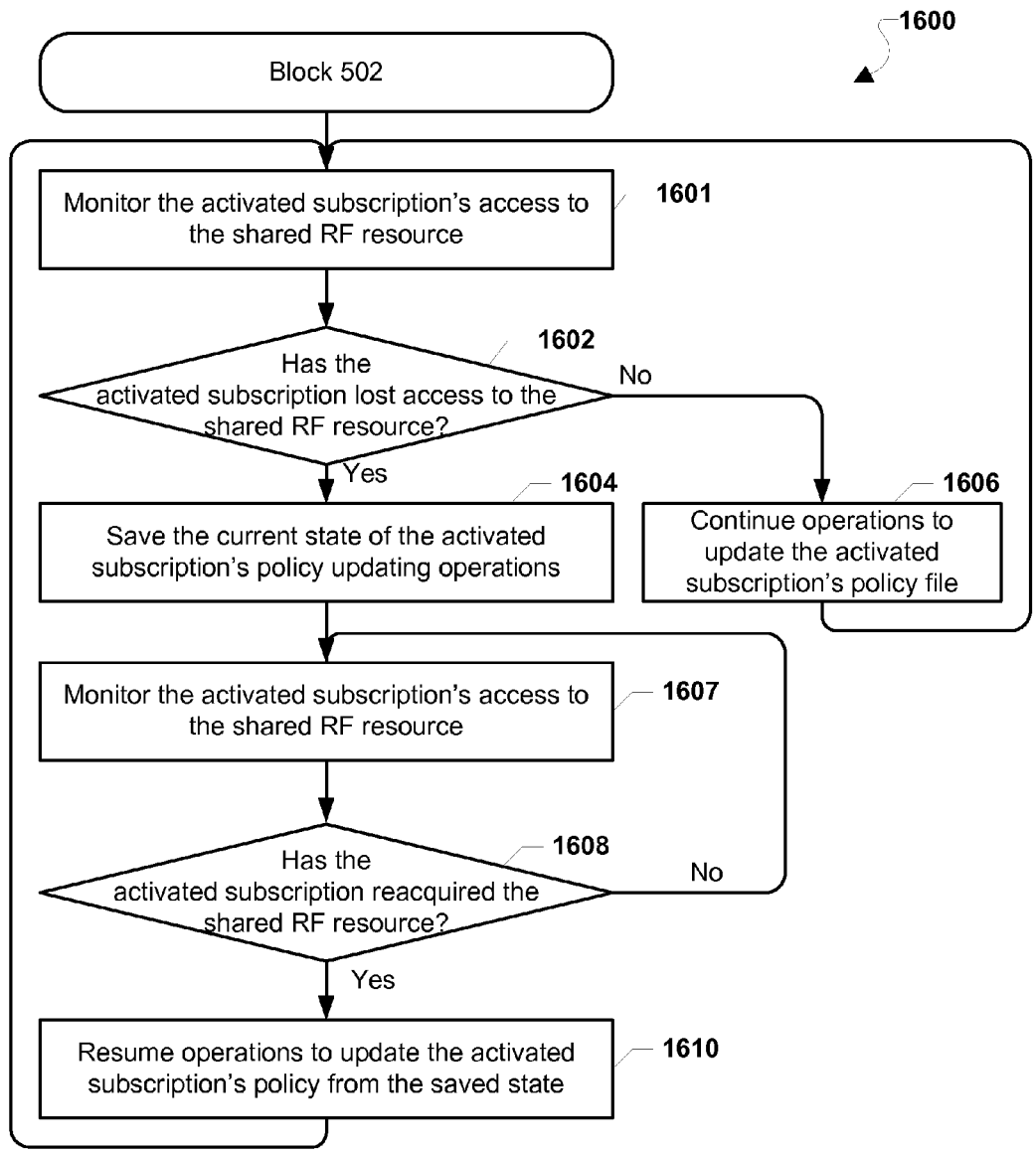
FIG. 16 is a process flow diagram illustrating a method of managing policy file updating for a subscription operating on a multi-SIM-multi-standby computing device according to various embodiments.

In some embodiments, the processor executing the MASC client may implement MASC functionality for subscriptions on a multi-SIM-multi-standby computing device by managing allocation of the shared RF resource (see, e.g., FIGS. 15B-16).

Figure 6:
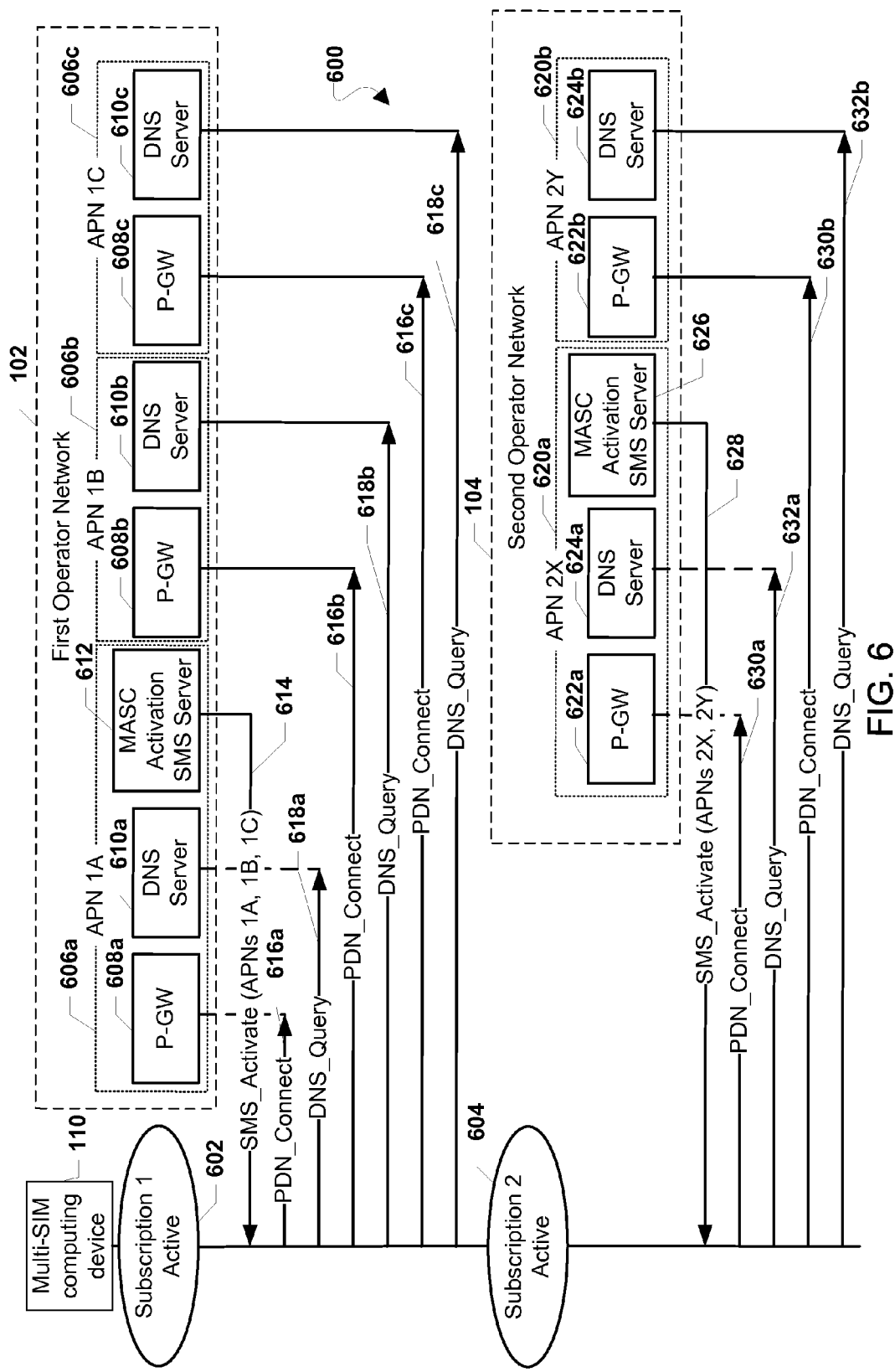
FIG. 6 is a signaling and call flow diagram illustrating communications between an MASC client operating on a multi-SIM computing device and operator networks for activating MASC functionality for subscriptions on the multi-SIM computing device using SMS messaging according to various embodiments.

FIG. 6 illustrates a signaling and call flow diagram 600 illustrating communications exchanged between a multi-SIM computing device (e.g., the multi-SIM computing device 110, 120, 200, 400 of FIGS. 1-4) executing the MASC client and operator networks (e.g., the operator networks 102, 104 of FIG. 1) associated with different subscriptions on the multi-SIM communication device for activating MASC functionality on those subscriptions.

With reference to FIGS. 1-6, in an example, the first operator network 102 may include three APNs: an APN 1A 606a, an APN 1B 606b, and an APN 1C 606c. The second operator network 104 may include two APNs: an APN 2X 620a and an APN 2Y 620b. While the operator networks 102, 104 are illustrated as having three APNs and two APNs, respectively, in various embodiments the operator networks 102, 104 may have an arbitrary number of APNs.

As discussed, the operator networks 102, 104 may each include one default APN (e.g., the APN 1A 606a and the APN 2X 620a). The default APNs 606a, 620a may respectively include MASC activation SMS servers 612 and 626. In some embodiments, each of the APNs 606a-606c, 620a-620b may include a PDN gateway (e.g., PDN gateways 608a, 608b, 608c in the first operator network 102 and PDN gateways 622a, 622b in the second operator network 104), and a DNS server (e.g., DNS servers 610a, 610b, 610c in the first operator network 102 and DNS servers 624a, 624b in the second operator network 104). In some embodiments, the gateways and servers of the operator networks 102, 104 may enable MASC functionality as described.

In some embodiments, the multi-SIM computing device 110 may include a first subscription 602 (labeled in FIG. 6 as "Subscription 1") and a second subscription 604 (labeled in FIG. 6 as "Subscription 2") for communicating with the operator networks 102, 104, respectively. In an example, the MASC activation SMS server 612 in the default APN 1A 606a may send an SMS activation signal 614 to a processor (e.g., the general processor 206 of FIG. 2 or the modem processor 401 of FIG. 4) executing an MASC client on the multi-SIM computing device 110. In some embodiments, the SMS activation signal 614 may identify the subscription for the MASC client to activate MASC functionality (i.e., the MASC activated subscription). In some embodiments, the SMS activation signal 614 may identify the APNs for which the MASC activated subscription will be activated. For example, the SMS activation signal 614 may instruct the MASC client to activate MASC functionality for the first subscription 602 for the APN 1A 606a, the APN 1B 606b, and the APN 1C 606c. Similarly, the default APN 2X 620a in the second operator network 104 may send an SMS activation signal to the multi-SIM computing device 110, instructing the MASC client to activate MASC functionality for the second subscription 604 for the APN 2X 620a and the APN 2Y 620b.

In some embodiments, after activating MASC functionality for a subscription, the processor of the multi-SIM computing device 110 executing the MASC client may establish a PDN connection with each APN identified in the activation signal. For example, for the first subscription 602, the processor executing the MASC client may send PDN connection signals 616a-616c to the PDN gateways 608a-608c to establish connection with the PDN gateways 608a-608c. In another example, the processor executing the MASC client may likewise send PDN connection signals 630a, 630b to the PDN gateways 622a, 622b in the second operator network 104 for the second subscription 604.

In some embodiments, the processor executing the MASC client may send DNS queries to DNS servers included in APNs identified in the SMS activation signals. For example, after connecting to the APNs 606a-606c in the first operator network 102 for the first subscription 602, the processor executing the MASC client may send DNS queries 618a-618c to the DNS servers 610a-610c in the APNs 606a-606c. Similarly, in response to connecting to the APNs 620a-620b in the second operator network 104, the processor executing the MASC client may also send DNS queries 632a, 632b to DNS servers 624a, 624b in the APNs 620a-620b for the second subscription 604.

In some embodiments, the SMS activation signals 614, 628 may only provide fully qualified domain names (FQDNs) that may need to be resolved by the DNS servers. In other words, the SMS activation signals 614, 628 may lack some important Internet-protocol (IP) information, such as address location information for one or more servers in the APNs, and the processor executing the MASC client may need to resolve the FQDNs via DNS queries to obtain the lacking/missing IP information. Thus, by making the DNS queries, the processor executing the MASC client may obtain the address location for one or more servers for APNs included in the activation signal for a subscription.

In some embodiments, the MASC activation SMS servers 612, 626 may send an activation signal for a subscription while the subscription is active (i.e., when the subscription is actively communicating with its operator network). In this event, the processor executing the MASC client may connect with a PDN gateway as described. In some embodiments, the MASC activation SMS servers 612, 626 may send an activation signal for a subscription while the subscription is inactive, meaning that the subscription cannot currently communicate with its network (e.g., a subscription on "idle-standby" in a multi-SIM-multi-standby computing device). In this case, the processor executing the MASC client may configure the subscription to communicate with its network, and the processor executing the MASC client may connect with the one or more APNs in the activation signal as discussed.

Figure 7:
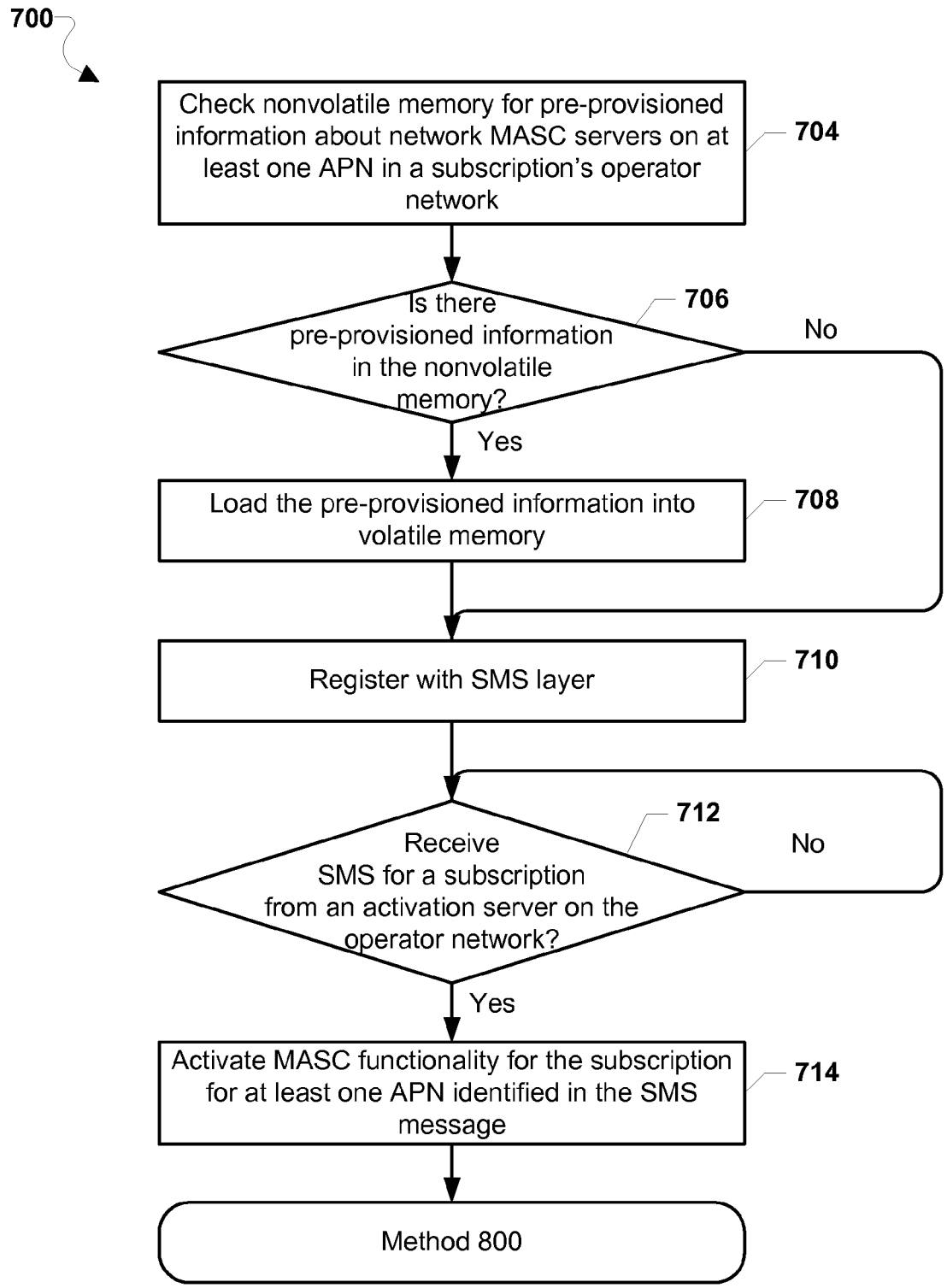
FIG. 7 is a process flow diagram illustrating a method of activating MASC functionality for a subscription on a multi-SIM computing device using SMS messaging according to various embodiments.

FIG. 7 illustrates a method 700 for activating MASC functionality for a subscription associated with one of the SIMs on a multi-SIM computing device. The method 700 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6). The operations of the method 700 implement some embodiments of the operations of block 502 of the method 500 of FIG. 5.

With reference to FIGS. 1-7, the processor executing the MASC client may check the multi-SIM computing device's nonvolatile memory (e.g., the nonvolatile memory 214a) for pre-provisioned information regarding network MASC servers for one or more APNs in a subscription's operator network, in block 704. In some embodiments, the pre-provisioned information may function as "default" data that enables the processor executing the MASC client to locate and connect to those MASC servers in the one or more APNs, thereby enabling the processor executing the MASC client to collaborate with the MASC servers in the one or more APNs in order to implement MASC functionality In some embodiments, for each APN, the pre-provisioned information may include data regarding the fully-qualified domain name (FQDN) or IP address of a policy server in the APN, the FQDN or IP address of the reporting server in the APN, a protocol-configuration-option (PCO) message ID, and a PCO message string.

In determination block 706, the processor executing the MASC client may determine whether there is pre-provisioned information in the nonvolatile memory. In response to determining that there is pre-provisioned information in the nonvolatile memory (i.e., determination block 706="Yes"), the processor executing the MASC client may load the pre-provisioned information into volatile memory (e.g., the volatile memory 214b) in block 708. In other words, the processor executing the MASC client may access the pre-provisioned information in anticipation of using the information to communicate with MASC servers in one or more APNs on the subscription's network. In some embodiments, the processor executing the MASC client may check for and load pre-provisioned information for each subscription on the multi-SIM computing device.

In response to determining that there is no pre-provisioned information in the nonvolatile memory (i.e., determination block 706="No") or loading the pre-provisioned information into volatile memory in block 708, the processor executing the MASC client may register with a Short Message Service (SMS) layer, in block 710. In some embodiments, the processor executing the MASC client may register with the SMS layer to receive SMS messages from a subscription's network. As described, an SMS message may include information regarding the subscription for which to activate the MASC functionality. The SMS message may also include information identifying/indicating one or more APNs in the subscription's operator network to activate. In other words, the SMS message may identify the subscription associated with the network, identify the APNs associated with that subscription, and activate MASC functionality for the identified subscription and APNs.

In determination block 712, the processor executing the MASC client may determine whether an SMS message for a subscription has been received from the operator network, and may continually/continuously repeat the operations in determination block 712 in a loop so long as an SMS message has been received from the operator network (i.e., while determination block 712="No"). In response to determining that an SMS message has been received from the subscription's operator network (i.e., determination block 712="Yes"), the processor executing the MASC client may activate the MASC functionality for the subscription for at least one APN identified in the activation signal/SMS message, in block 714. For example, the processor executing the MASC client may activate MASC functionality by setting a bit, flag, or other indication that informs the MASC client that MASC functionality should be implemented for the identified subscription.

Figure 8:
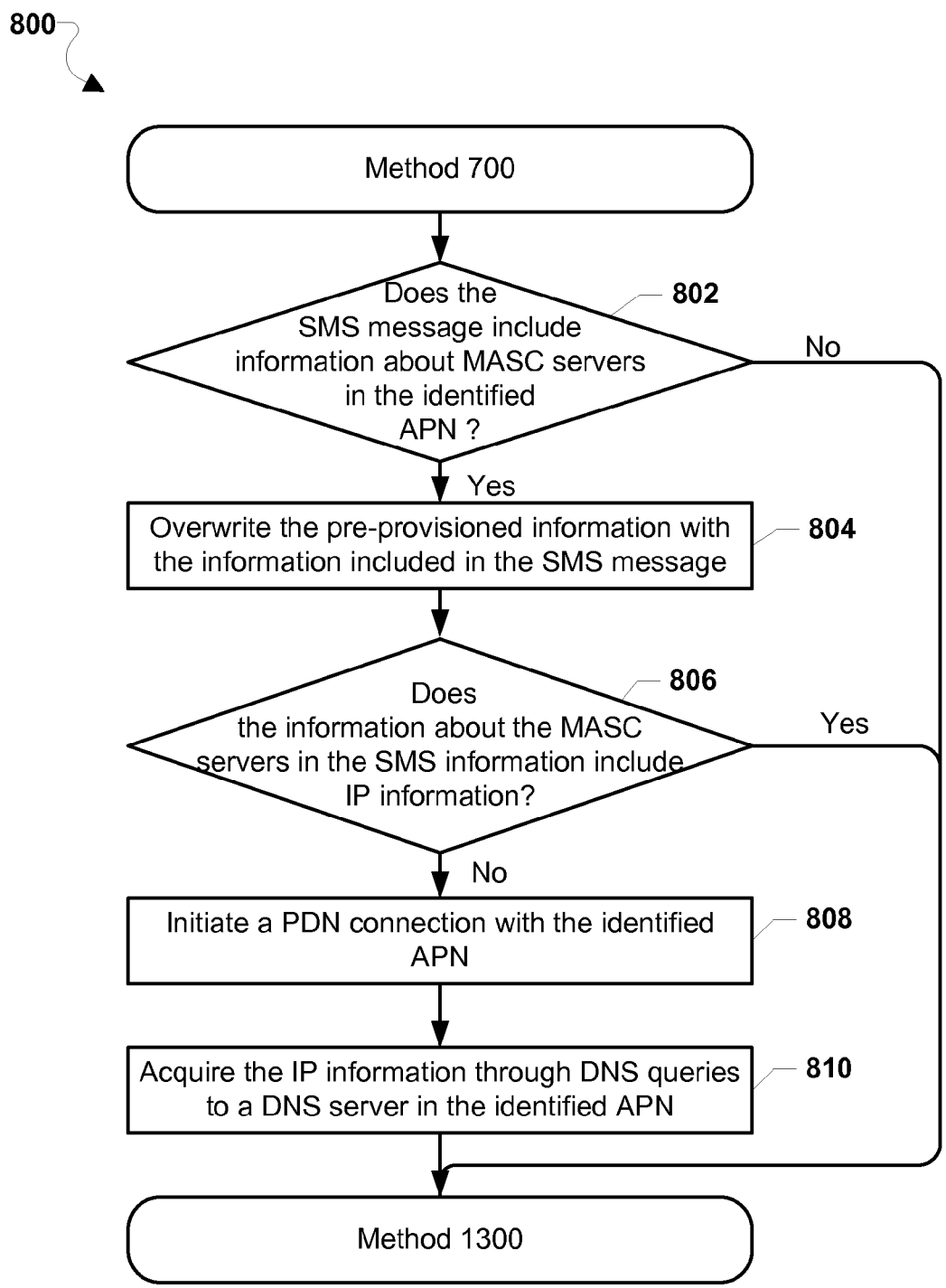
FIG. 8 is a process flow diagram illustrating a method of resolving server location information received in SMS messaging according to various embodiments.

The processor executing the MASC client may continue performing operations in a method 800 of FIG. 8.

FIG. 8 illustrates the method 800 for updating information about an APN included in an SMS message received from a subscription's network. The method 800 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6). With reference to FIGS. 1-8, the operations of the method 800 implement some embodiments of the operations of the method 700. The processor executing the MASC client may begin performing the operations in the method 800 in response to activating MASC functionality for a subscription identified in the SMS message for one or more APNs in block 714 of the method 700.

In determination block 802, the processor executing the MASC client may determine whether the SMS message includes information about MASC servers in an APN identified in the SMS message. As described, the information about the MASC servers may include fields for FQDN or IP address of policy and reporting servers, PCO message IDs, and PCO message strings.

In response to determining that the SMS message does not include information about MASC servers (i.e., determination block 802="No"), the processor executing the MASC client may continue performing operations in block 1302 of method 1300 (see FIG. 13) by attempting to establish a connection with a policy management server.

In response to determining that the SMS message does include information about MASC servers in an APN identified in the SMS message (i.e., determination block 802="Yes"), the processor executing the MASC client may overwrite the pre-provisioned information (see, e.g., FIG. 7) with the information included in the SMS message. In some embodiments, the information included in the SMS message may be newer information than the previously stored, pre-provisioned information stored on the multi-SIM computing device.

In determination block 806, the processor executing the MASC client may determine whether the information about the MASC servers in the SMS information includes IP information (i.e., does not only include FQDN data). In response to determining that information about the MASC servers includes IP information, for example, by including more than just FQDN data (i.e., determination block 806="Yes"), the processor executing the MASC client may continue in block 1302 of the method 1300 (see FIG. 13) by attempting to establish a connection with a policy management server.

In response to determining that the information regarding the MASC servers in the SMS information does not include IP information (e.g., by only including FQDN data) (i.e., determination block 806="No"), the processor executing the MASC client may initiate a PDN connection with the APN identified in the SMS message, in block 808. In block 810, the processor executing the MASC client may resolve the lack of IP information through DNS queries to a DNS server in the APN. For example, the device processor executing the MASC client may resolve the FQDNs by submitting DNS queries to the APN. The processor executing the MASC client may continue in block 1302 of the method 1300 by attempting to establish a connection with a policy management server.

In some embodiments, the SMS message may identify multiple APNs, and the processor executing the MASC client may perform the operations of the method 800 for each APN identified in the SMS message.

Figure 9:
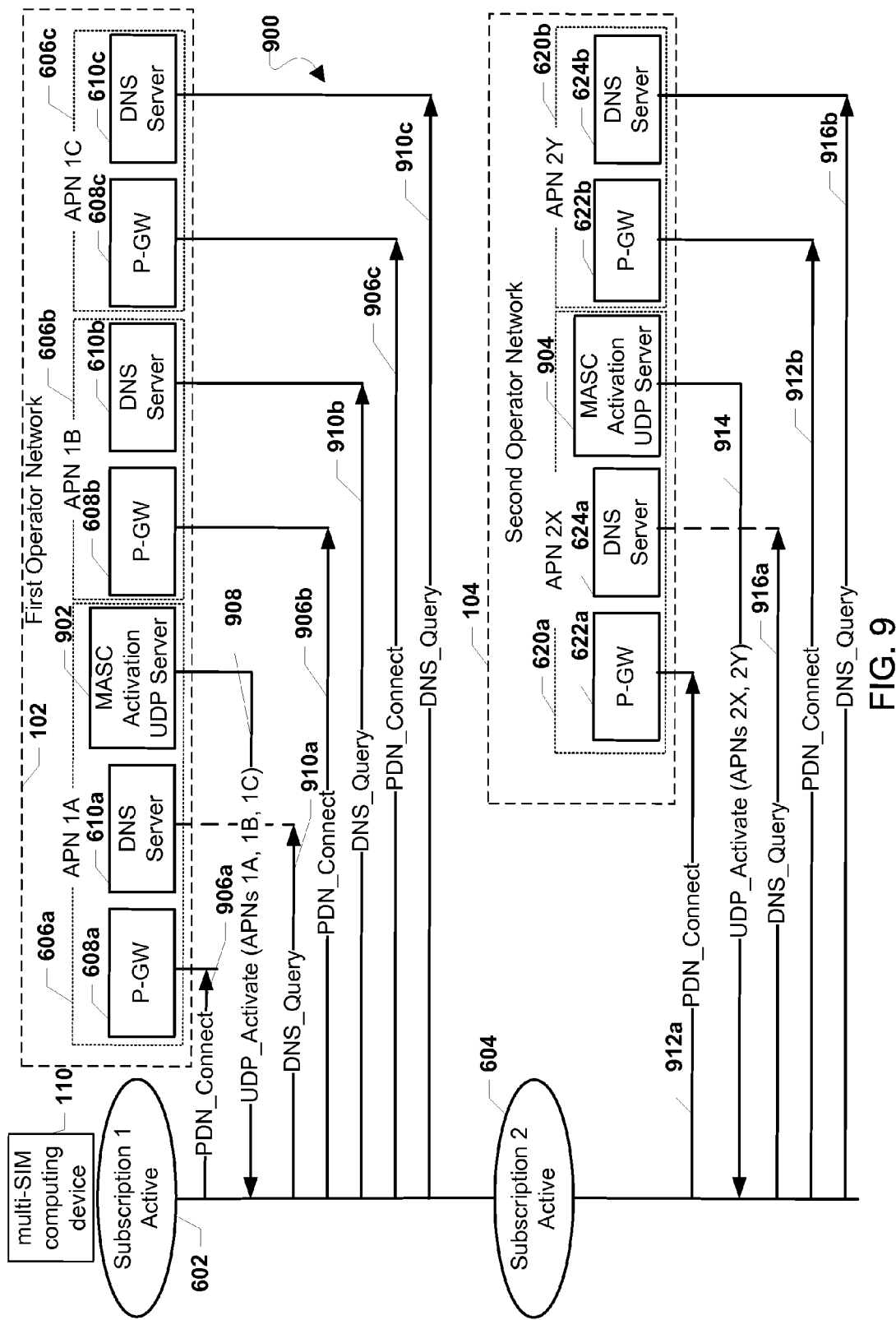
FIG. 9 is a signaling and call flow diagram illustrating communications between an MASC client operating on a multi-SIM computing device and operator networks for activating MASC functionality for multiple subscriptions on the multi-SIM computing device using User Datagram Protocol (UDP) packets according to various embodiments.

FIG. 9 is a signaling and call flow diagram 900 illustrating communications exchanged between a multi-SIM computing device executing an MASC client (e.g., the multi-SIM computing device 110, 120, 200, 400 of FIGS. 1-4) and multiple operator networks each associated with different subscriptions on the multi-SIM computing device 110 (e.g., the operator networks 102, 104 of FIG. 1) for activating MASC functionality on those subscriptions.

With reference to FIGS. 1-9 and in some embodiments, instead of utilizing the MASC activation SMS servers 612, 626 to instruct a processor of the multi-SIM computing device 110 executing the MASC client to activate MASC functionality for the first subscription 602 and the second subscription 604 of the multi-SIM computing device 110 as described (see, e.g., FIG. 6), the default APN 1A 606a and the default APN 2X 620a may each include an MASC-activation UDP server (e.g., MASC-activation UDP servers 902, 904). In such embodiments, the processor executing the MASC client may open a UDP listening port, such as by sending PDN connection signals 906a, 912a to the default APN 1A 606a and the APN 2X 620a on behalf of the first subscription 602 and the second subscription 604, respectively.

In some embodiments, the processor executing the MASC client on the multi-SIM computing device 110 may listen for an UDP activation signal from the MASC-activation UDP servers 902, 904 on the opened UDP listening port. As shown, for example, the MASC-activation UDP server 902 may send a UDP activation signal 908 to the multi-SIM computing device 110 for the first subscription 602. The UDP activation signal 908 may include information indicating the subscription (e.g., the first subscription 602) and the APNs for which the mobile-computing-device processor executing the MASC client is to activate MASC functionality, such as the APNs 606a-606c.

In another example, the MASC-activation UDP server 904 may similarly send a UDP activation signal 914 to the multi-SIM computing device 110, instructing the mobile-computing-device processor executing the MASC client application to activate MASC functionality for the second subscription 604 for the APNs 620a-620b.

In some embodiments, after receiving at least one UDP activation signal, the processor executing the MASC client may send DNS queries and establish PDN connections to other APNs identified in the UDP activation signals by performing operations similar to those described above (see, e.g., FIG. 6). For example, in response to establishing a PDN connection with the default APN 1A 606a and receiving the UDP activation signal 908 for the first subscription 602, the processor executing the MASC client on the multi-SIM computing device 110 may establish PDN connections with the APNs 606b-606c by sending PDN connection signals 906b-906c to the APNs 606b-606c, respectively, and may initiate DNS queries with the APNs 606a-606c via DNS querying signals 910a-910c. The processor executing the MASC client may similarly perform PDN connections and DNS queries on behalf of the second subscription 604 via PDN connection signals 912a-912b and DNS query signals 916a-916b.

Figure 10:
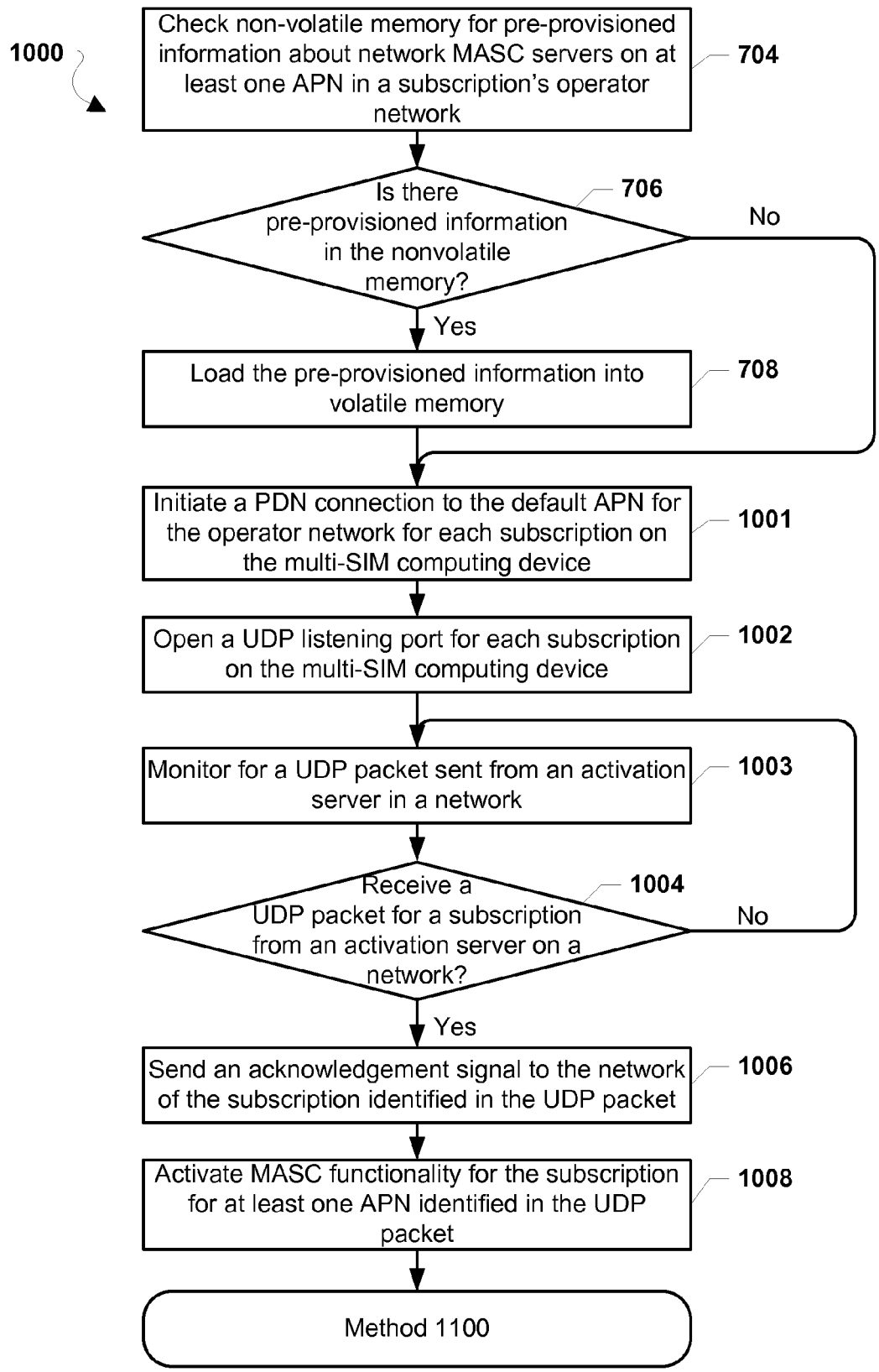
FIG. 10 is a process flow diagram illustrating a method of activating MASC functionality for a subscription on a multi-SIM computing device using UDP packets according to various embodiments.

FIG. 10 illustrates a method 1000 for activating MASC functionality for a subscription of a multi-SIM computing device. The method 1000 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9). The operations of the method 1000 implement some embodiments of the operations of block 502 of method 500 described above with reference to FIG. 5.

Thus, with reference to FIGS. 1-10, the processor executing the MASC client may check the multi-SIM computing device's non-volatile memory for pre-provisioned information regarding network MASC servers on one or more APNs on the subscription's operator network, in block 704.

In determination block 706, the processor executing the MASC client may determine whether there is pre-provisioned information in the nonvolatile memory, as described. In response to determining that there is pre-provisioned information in the non-volatile memory (i.e., determination block 706="Yes"), the processor executing the MASC client may load the pre-provisioned information into volatile memory in block 708, such as by checking for and loading pre-provisioned information for each subscription on the multi-SIM computing device. In some embodiments, the processor executing the MASC client may perform the operations of block 704-708 by performing operations similar to those described with reference to blocks 704-708 of the method 700.

After loading the pre-provisioned information into volatile memory in block 708 or in response to determining that there is no pre-provisioned information in the non-volatile memory (i.e., determination block 706="No"), the processor executing the MASC client may initiate a PDN connection to the default APN for the operator network for each subscription on the multi-SIM computing device, in block 1001. In some embodiments of the operations performed in block 1001, the processor executing the MASC client may initiate a PDN connection to the default APN for the operator network for each subscription on the multi-SIM computing device.

In block 1002, the processor executing the MASC client may open a UDP listening port for each subscription on the multi-SIM computing device. In some embodiments, by opening a UPD listening port for each subscription, the processor executing the MASC client may enable the subscriptions' respective network to send UDP packets that may facilitate activating MASC functionality for the one or more subscriptions.

In block 1003, the processor executing the MASC client may monitor for a UDP packet sent from an activation server, and may continue to monitor for a UDP packet so long as a UDP packet is not received from an activation server in a network (i.e., while determination block 1004="No"). In some embodiments, the UDP packet may identify or indicate a particular subscription associated with the network on which the activation server operates.

In response to determining that that a UDP packet has been received from an activation server (i.e., determination block 1004="Yes"), the processor executing the MASC client may send an acknowledgment signal to the network of the subscription identified in the UDP packet in block 1006. The processor executing the MASC client may activate MASC functionality for the identified subscription for one or more APNs identified in the UDP packet, in block 1008, such as by performing operations similar to those operations described with reference to block 714 of the method 700.

The processor executing the MASC client may continue performing operations in determination block 1102 in method 1100 (see FIG. 11) by determining whether the received UDP packet includes information about MASC servers in an APN identified in the UDP packet.

Figure 11:
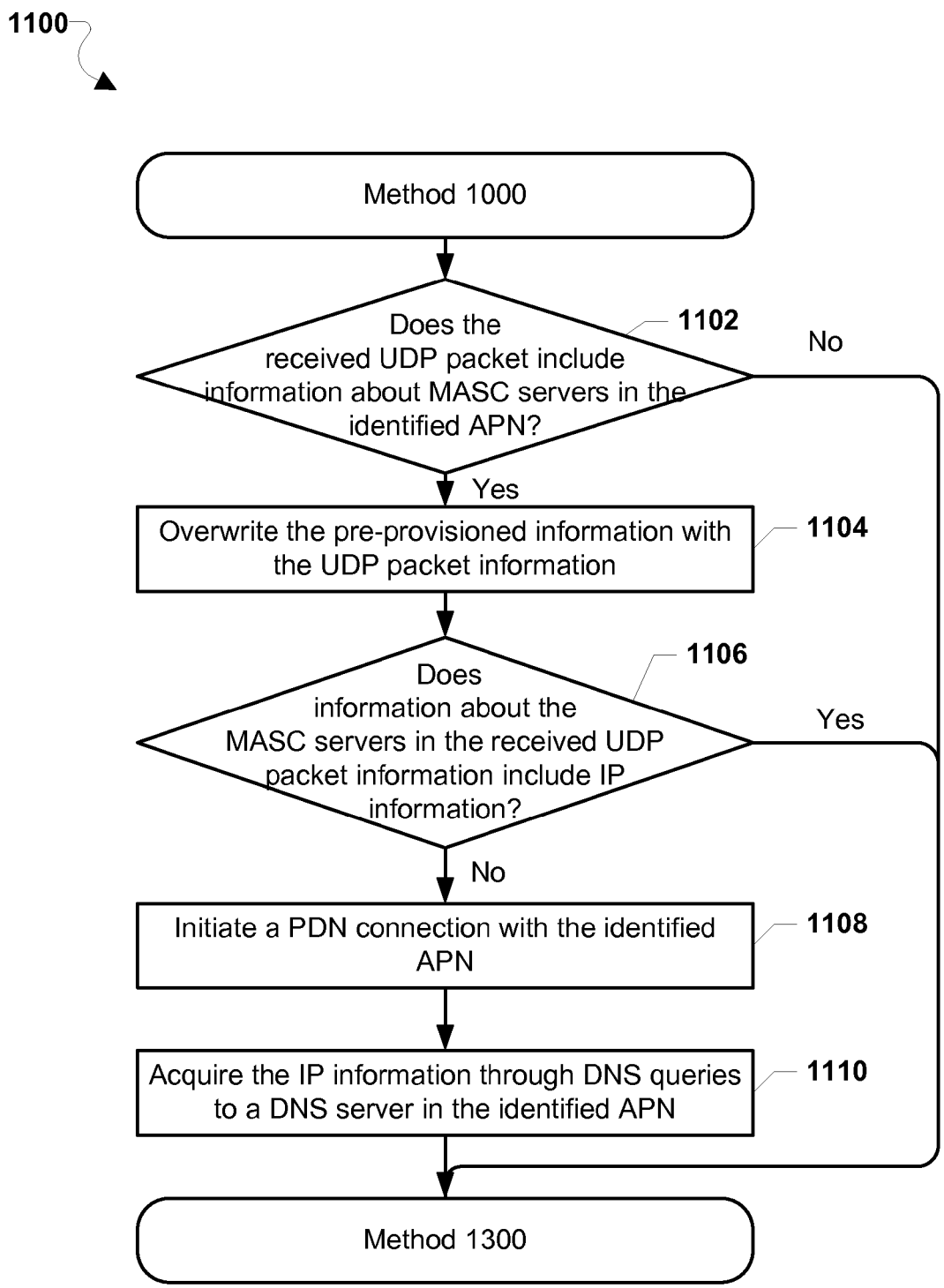
FIG. 11 is a process flow diagram illustrating a method of resolving server location information received in a UDP packet according to various embodiments.

FIG. 11 illustrates the method 1100 for updating information about an APN included in a UDP packet received from a subscription's network. The method 1100 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9). The operations of the method 1100 implement some embodiments of the operations of the method 1000 of FIG. 10. Thus, with reference to FIGS. 1-11, the processor executing the MASC client may perform the operations of the method 1100 in response to activating MASC functionality for the identified subscription for one or more APNs in block 1008 of the method 1000.

In determination block 1102, the processor executing the MASC client may determine whether the received UDP packet includes information about MASC servers in an APN identified in the received UDP packet. As described (see, e.g., FIG. 8), the information in the UDP packet may include fields for FQDN and/or IP addresses of policy and reporting servers, PCO message IDs, and PCO message strings.

In response to determining that the UDP packet includes information about MASC servers in an APN identified in the received UDP packet (i.e., determination block 1102="Yes"), the processor executing the MASC client may overwrite the pre-provisioned information with the information included in the UDP packet, in block 1104.

In determination block 1106, the processor executing the MASC client may determine whether the information about the MASC servers in the information included in the received UDP packet includes IP information. In other words, the processor executing the MASC client may determine whether the information included in the received UDP packet does not only include FQDNs associated with the MASC servers. In response to determining that the information about the MASC servers in the received UDP packet information does not include IP information (i.e., determination block 1106="No"), the processor executing the MASC client may initiate a PDN connection with the identified APN, in block 1108. In block 1110, the processor executing the processor executing the MASC client may acquire the IP information through DNS queries to a DNS server in the identified APN. In some embodiments, the processor executing the MASC client may send the DNS queries to a DNS server within the APN. In some embodiments, the DNS query may include FQDN information about a policy server in the identified APN and/or a reporting server in the identified APN. By resolving the FQDNs, the processor executing the MASC client may obtain IP addresses for the various MASC servers in the APN.

After acquiring the IP information through DNS queries in block 1110 or in response to determining that the UDP packet does not include information about MASC servers in the APN identified in the UDP packet (i.e., determination block 1102="No") or that the information about the MASC servers in the received UDP packet information includes IP information (i.e., determination block 1106="Yes"), the processor executing the MASC client may continue in block 1302 of method 1300 (see FIG. 13) by attempting to establish a connection with an MASC policy management server in an APN included in an activation signal for a subscription.

In some embodiments, the processor executing the MASC client may perform the operations of the method 1100 for each APN included/identified in the UDP packet.

Figure 12:
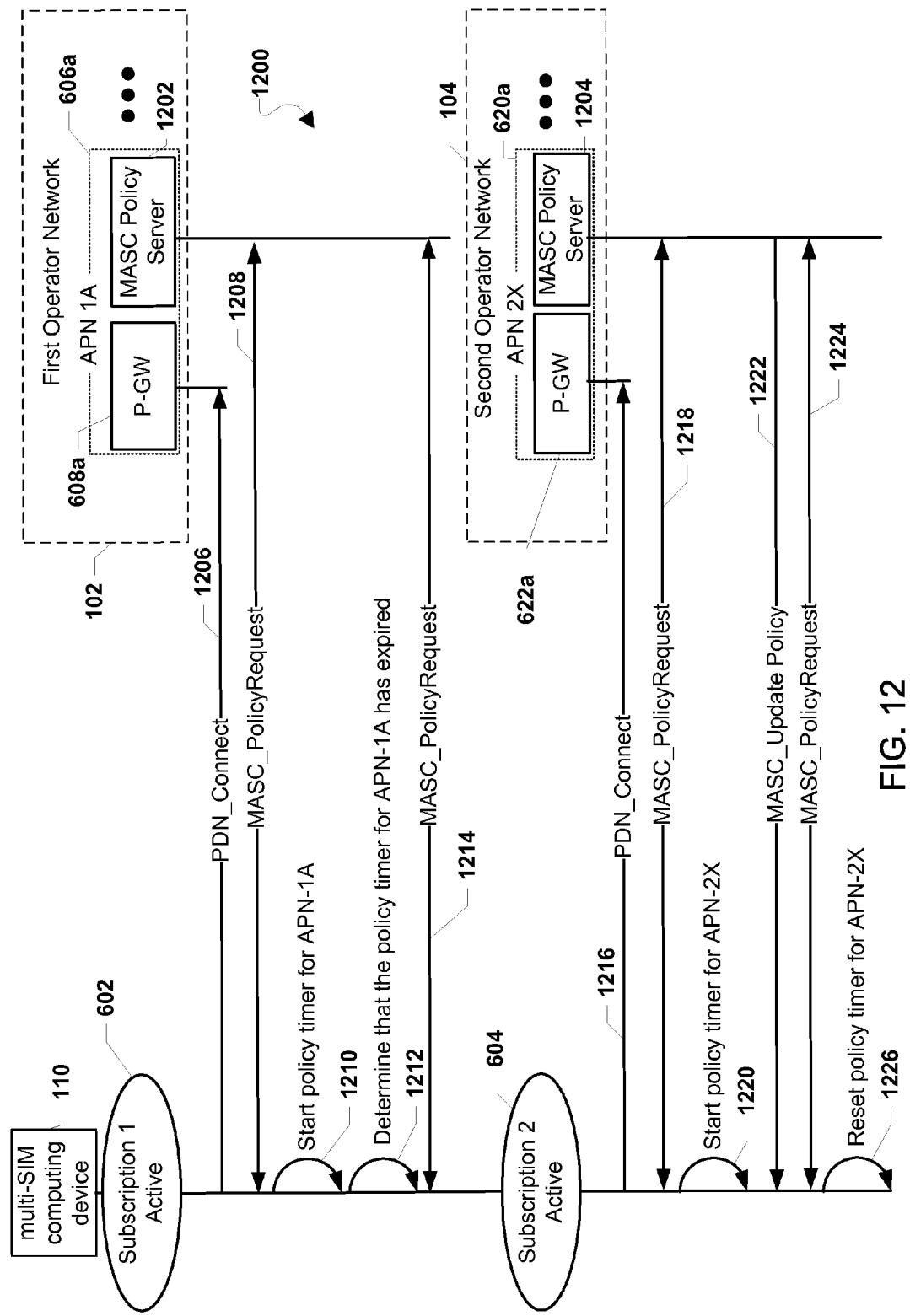
FIG. 12 is a signaling and call flow diagram illustrating communications between an MASC client operating on a multi-SIM computing device and operator networks for obtaining MASC policy information for one or more APNs according to various embodiments.

FIG. 12 is a signaling and call flow diagram 1200 illustrating communications exchanged between a multi-SIM computing device executing an MASC client (e.g., the multi-SIM computing device 110, 120, 200, 400 of FIGS. 1-4) and multiple operator networks each associated with different subscriptions on the multi-SIM computing device 110 (e.g., the operator networks 102, 104 of FIG. 1) for obtaining and updating policy files.

With reference to FIGS. 1-12, in some embodiments, after activating MASC functionality for one or more subscriptions (see, e.g., the method 1000), a processor of the multi-SIM computing device 110 executing the MASC client may attempt to obtain policy files from APNs that were identified in an activation signal (e.g., SMS messages and/or UDP messages). For example, the first subscription 602 may be subscribed to the first operator network 102, as discussed, and the processor executing the MASC client may have previously activated MASC functionality for the first subscription 602 for the APN 1A 606*a*. Similarly, the second subscription 604 may be subscribed to the second operator network 104, and the processor executing the MASC client may have previously activated MASC functionality for the second subscription 604 for the APN 2X 620*a*.

In some embodiments, a policy file from an APN may include, among other things, a list of applications that may access network resources through that APN or that should be monitored. Specifically, for a particular subscription that has had MASC functionality activated for an APN, the processor executing the MASC client may connect with that APN and request a policy file. As illustrated, the multi-SIM computing device 110 may establish a PDN connection with the PDN gateway 608*a* included in the APN 1A 606*a* via a PDN connection signal 1206. The device processor executing the MASC client may then send an MASC-policy-file request signal 1208 to an MASC policy server 1202 included in the APN 606*a* via a connection (e.g., an HTTP, HTTPS, FTP, TFTP, TCP, or UDP connection or a connection initiated using various other protocols) and the MASC policy server 1202 may return the policy file in response.

In some embodiments, upon receiving a policy file for an APN associated with a subscription, the processor executing the MASC client may start a policy timer. For example, the processor executing the MASC client may start a policy timer for the APN 1A 606*a*, in operation 1210, in response to receiving the policy file from the MASC policy server 1202 included in APN 1A 606*a* via the MASC-policy-file request signal. In such embodiments, the processor executing the MASC client may continually determine whether the policy timer has expired for each APN from which a policy file has been received. In response to determining that the policy timer (e.g., the policy timer for APN 1A 606*a*) has expired in operation 1212, the processor executing the MASC client may attempt to update the policy file from the MASC Policy Server 1202 through a subsequent MASC policy request signal 1214.

In some embodiments, the processor executing the MASC client may receive a policy update notification from an APN (e.g., before the policy's timer has expired). For example, after the multi-SIM computing device 110 connects to the PDN gateway 622*a* in the APN 2X 620*a* via a PDN connection signal 1216 (e.g., via an HTTP/HTTPS, FTP, TFTP, TCP, UDP, etc., connection) and receives an MASC policy file from an MASC policy server 1204 via an MASC-policy-file request signal 1218. In response, the processor executing the MASC client may start a policy timer associated with the APN 2X 620*a*, in operation 1220. However, before the policy timer associated with the APN 2X 620*a* expires, the MASC policy server 1204 in the APN 2X 620*a* may send an MASC-policy-file update notification 1222 to the multi-SIM computing device 110. In response, the processor executing the MASC client may send a subsequent MASC policy file request 1224 to the MASC policy server 1204 and may receive an updated policy file from the MASC policy server 1204. As a result of receiving the updated policy file, the processor executing the MASC client may reset the policy timer associated with the APN 2X 620a in operation 1226.

Figure 13:
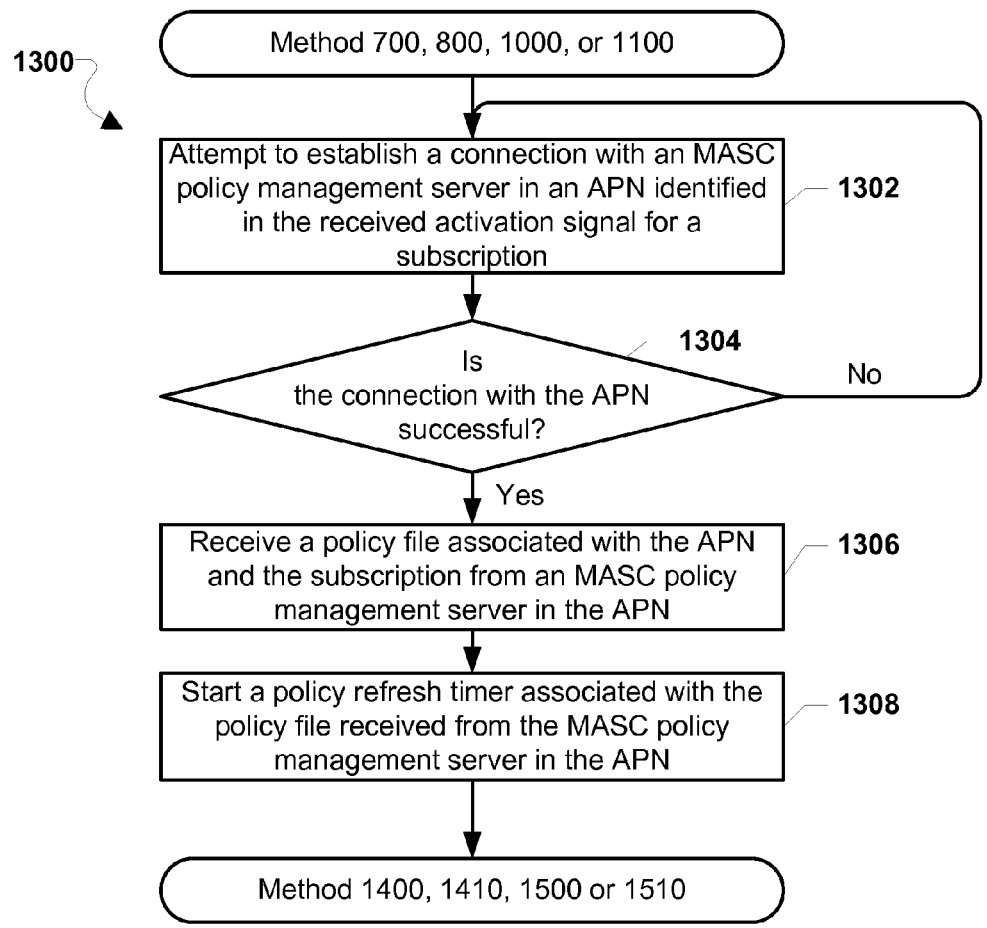
FIG. 13 is a process flow diagram illustrating a method of obtaining a policy file for a subscription on a multi-SIM computing device from an APN according to various embodiments.

FIG. 13 illustrates a method 1300 for maintaining a policy for a subscription. The method 1300 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9, 12). With reference to FIGS. 1-13, in some embodiments, the processor executing the MASC client may begin performing the operations of the method 1300 in response to activating MASC functionality for a subscription, such as in response to performing the operations of the methods 700, 800, 1000, or 1100 (see FIGS. 7, 8, 10, and 11).

In block 1302, the processor executing the MASC client may attempt to establish a connection with the MASC-policy-management server of an APN identified in the received activation signal (e.g., the received SMS or UDP message) for a subscription, and may continue attempting to establish a connection with the MASC policy management server so long as the connection attempt is unsuccessful (i.e., while determination block 1304="No"). In some embodiments, the connection may be any one of an HTTP connection, an HTTPS connection, an FTP connection, a TFTP connection, a TCP connection, a UDP connection, or any other protocol that may be used to download a file or exchange communications with a wireless network.

In some embodiments, the processor executing the MASC client may implement various failure handling techniques, such as configuring the multi-SIM computing device to wait for a certain amount of time before starting a subsequent attempt to establish a connection with the APN.

In response to determining that the connection attempt with the APN has been successfully established (i.e., determination block 1304="Yes"), the processor executing the MASC client may download/receive a policy file associated with the APN and the subscription from an MASC-policy-management server in the APN, in block 1306. As described, the policy file may include a list of applications that are associated with the APN and the subscription and that are authorized to access network resources.

In block 1308, the processor executing the MASC client may start a policy refresh timer associated with the policy file received in block 1306 from the MASC-policy-management server in the APN. In some embodiments, the processor executing the MASC client may utilize the policy refresh timer to ensure that the policy file received from the MASC-policy-management server stays up to date. For example, the MASC-policy-management server and/or another component of the APN may add or remove applications authorized to access network resources as a result of a change in data plans associated with the multi-SIM computing device.

The processor executing the MASC client may determine whether or when to update the policy file in various circumstances, some embodiments methods of which are described (e.g., methods 1400, 1410, 1500, 1510 of FIGS. 14A-15B, respectively). In some embodiments, the processor executing the MASC client may repeatedly perform the operations of the method 1300 each time a policy file for an APN associated with the subscription is to be updated, such as after a policy timer has expired or in response to receiving a notification of an updated policy.

For ease of description, the description of the operations performed in the method 1300 pertains to maintaining a policy for a subscription for one APN. However, the processor executing the MASC client may maintain a policy for the subscription for one or more APNs in the subscription's network. In such embodiments, the processor executing the MASC client may separately perform the various operations of method 1300 for each APN associated with a subscription.

In some embodiments, the processor executing the MASC client may perform the operations of method 1300 for each subscription operating on the multi-SIM computing device such that the processor executing the MASC client simultaneously or nearly simultaneously maintains policies for each of multiple subscriptions.

Figure 14A:
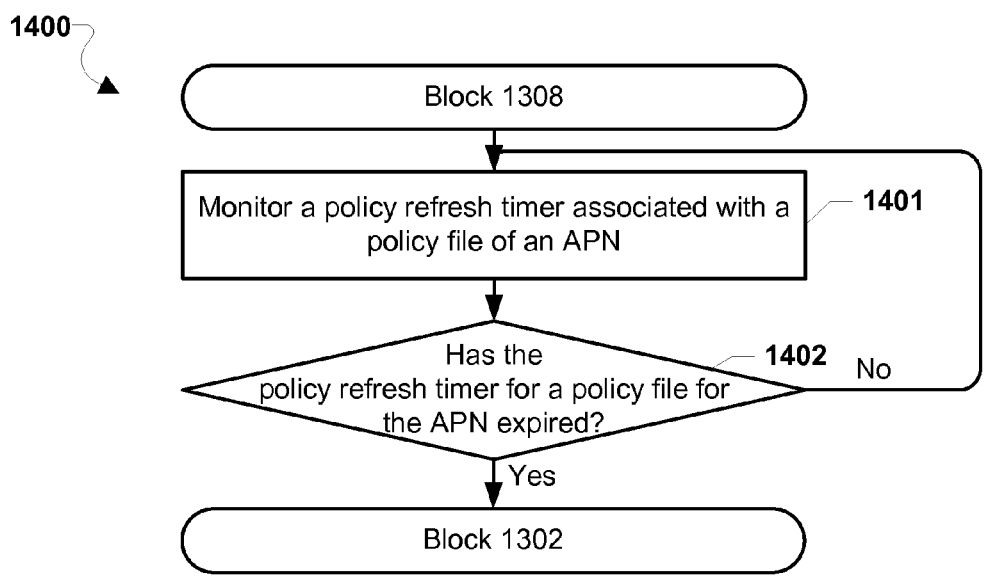
FIG. 14A is a process flow diagram illustrating a method of updating a policy file when a policy refresh timer for the policy file expires according to various embodiments.
Figure 14B:
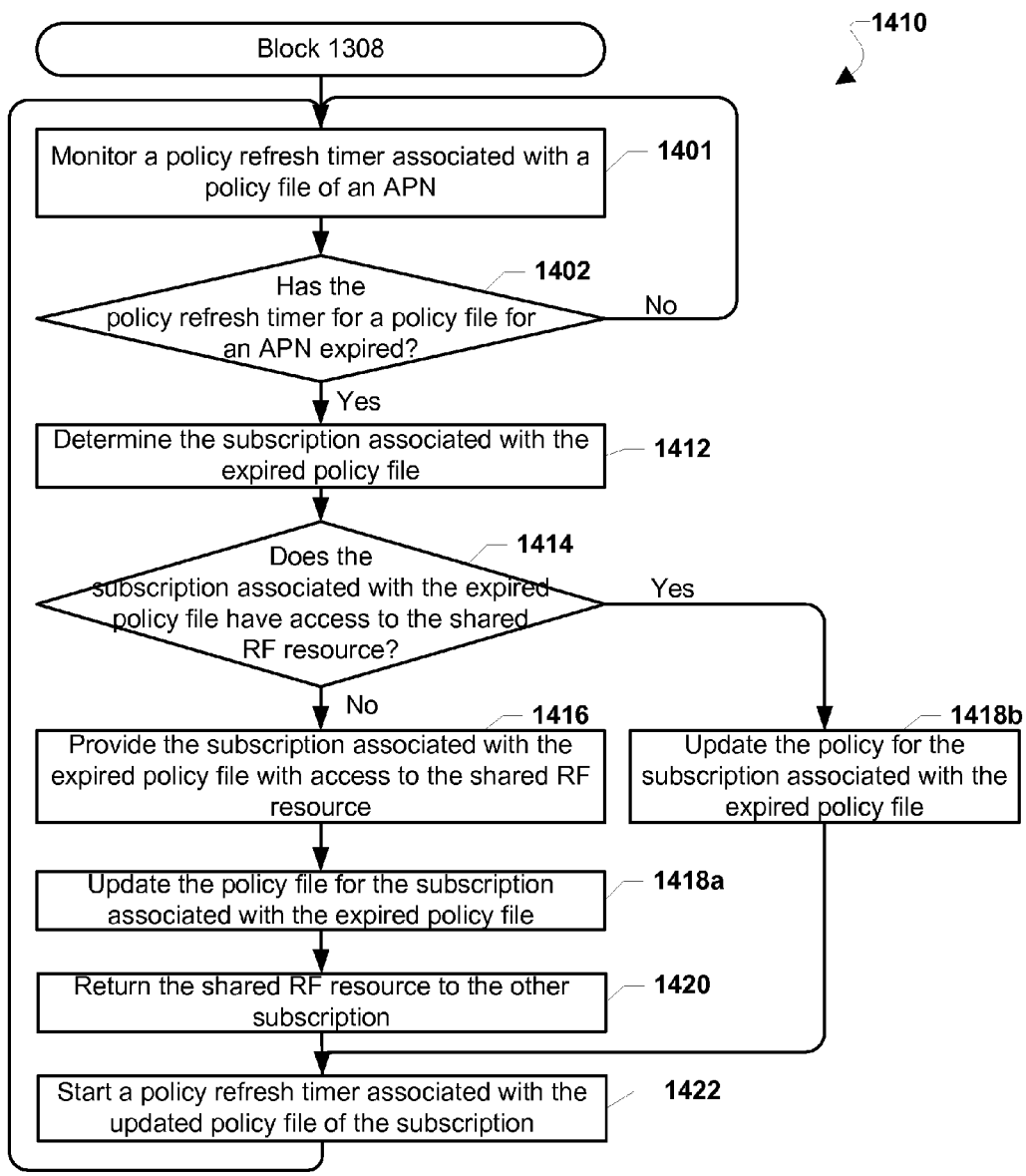
FIG. 14B is a process flow diagram illustrating a method of updating a policy file on a multi-SIM-multi-standby computing device when a policy refresh timer for the policy file expires according to various embodiments.

FIGS. 14A and 14B illustrate methods 1400, 1410, respectively, for updating a policy file for an APN in response to determining that a policy refresh timer for a policy file has expired. The methods 1400, 1410 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9, 12). The operations of the methods 1400, 1410 implement some embodiments of the operations of the method 1300 (see FIG. 13). Thus, with reference to FIGS. 1-14B, the processor may perform the operations of the method 1400 or the method 1410 in response to starting a policy refresh timer associated with a policy file received from an MASC-policy management server in an APN in block 1308 of the method 1300.

With reference to the method 1400, the multi-SIM computing device may be a multi-SIM-multi-active device, such that each subscription may individually have access to a separate RF resource for communicating with their respective operator networks. Thus, in some embodiments, the processor executing the MASC client may update policy files for the multiple subscriptions on the multi-SIM computing device in parallel because each of the multiple subscriptions may have access to a dedicated RF resource. In other words, the processor executing the MASC client may update policy files for a subscription without regard for the activities of other subscriptions.

In block 1401, the processor executing the MASC client may monitor a policy refresh timer associated with a policy file of an APN, and may continue monitoring the policy refresh timer so long as the policy refresh timer has not expired (i.e., while determination block 1402=No"). In some embodiments, the processor executing the MASC client may monitor the policy refresh timer until a certain period of timer elapses, at which the point the policy refresh timer may be "expired." In some embodiments, an expired policy refresh timer may indicate the need to update the policy file associated with the refresh timer. In some embodiments, the processor executing the MASC client may monitor policy refresh timers in the background while performing other tasks.

In response to determining that the policy refresh timer has expired (i.e., determination block 1402="Yes"), the processor executing the MASC client may continue performing the operations in block 1302 of the method 1300

(see FIG. 13) by attempting to establish a connection with the APN in order to update the policy file associated with the expired policy refresh timer.

With reference to the method 1410, the multi-SIM computing device may be a multi-SIM-multi-standby device. In such embodiments, the processor executing the MASC client may reallocate shared RF resources between subscriptions in order to update policy files for one subscription while another subscription is using the shared RF resource. In other words, the processor executing the MASC client may manage each of the multiple subscriptions' access to the shared RF resource to facilitate policy files updates.

In block 1401, the processor executing the MASC client may monitor a policy refresh timer associated with a policy file of an APN, and may continue monitoring the policy refresh timer until the processor executing the MASC client determines that the policy refresh timer has expired (i.e., while determination block 1402=No"). In some embodiments, the processor executing the MASC client may perform operations similar to those described with reference to blocks 1401, 1402 of the method 1400 (see FIG. 14A).

In response to determining that the policy refresh timer for a policy file has expired (i.e., determination block 1402="Yes"), the processor executing the MASC client may determine the subscription associated with the expired policy file in block 1412. In determination block 1414, the processor executing the MASC client may determine whether the subscription associated with the expired policy file has access to a shared RF resource. In some embodiments, because the RF resource is shared among multiple subscriptions on the multi-SIM-multi-standby device, the processor executing the MASC client may need to determine whether the subscription with an expired policy has access to the shared RF resource. In other words, the subscription with an expired policy file may need to have access to the shared RF resource in order to update its policy file.

In response to determining that the subscription associated with the expired policy file has access to the shared RF resource (i.e., determination block 1414="Yes"), the processor executing the MASC client may update the policy for the subscription associated with the expired policy file in block 1418b. In some embodiments of the operations performed in block 1418b, the processor executing the MASC client may update the subscription's expired policy file by performing operations similar to those described above with reference to the method 1300 (see FIG. 13).

In response to determining that the subscription associated with the expired policy file does not have access to the shared RF resource (i.e., determination block 1414="No"), the processor executing the MASC client may provide the subscription associated with the expired policy file with access to the shared RF resource, in block 1416. In some embodiments, the processor executing the MASC client may remove access to the shared RF resource from another subscription and provide access to the RF resource to the subscription associated with the expired policy file. In some embodiments (not shown), the processor executing the MASC client may first determine whether the subscription with current access to the shared RF resource is actively using the shared RF resource (e.g., on a voice or data call), and the processor executing the MASC client may only give access to the shared RF resource to the subscription associated with the expired policy file in the event that the other subscription's active use of the shared RF resource ends.

In block 1418a, the processor executing the MASC client may update the policy for the subscription associated with the expired policy file, such as by performing operations similar to those described with reference to block 1418b, and the processor executing the MASC client may return the shared RF resource to the other subscription, in block 1420.

After updating the policy for the subscription associated with the expired policy file in block 1418b or returning the shared RF resource to the other subscription in block 1420, the processor executing the MASC client may start a policy refresh timer associated with the updated policy of the subscription in block 1422. The processor executing the MASC client may periodically repeat the above operations in a loop by again determining in determination block 1402 whether the policy refresh time associated with the updated policy file has expired.

FIGS. 15A and 15B illustrate methods 1500, 1510 for updating a policy file in response to receiving an update notification from an APN. The methods 1500, 1510 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9, 12). The operations of the methods 1500, 1510 implement some embodiments of the operations of the method 1300 (see FIG. 13). Thus, with reference to FIGS. 1-15B, the processor may perform the operations of the method 1500 or the method 1510 in response to starting a policy refresh timer associated with a policy file received from an MASC-policy management server in an APN in block 1308 of the method 1300.

With reference to the method 1500, the multi-SIM computing device may be a multi-SIM-multi-active computing device, thereby enabling each subscription on the multi-SIM-multi-active computing device to individually receive access to a separate RF resource for communicating with their respective networks.

In block 1502, the processor executing the MASC client may listen on a configured UDP port or an SMS port for an update notification from an MASC policy server in an APN until determining that an update notification has been received from an MASC policy server in an APN (i.e., while determination block 1504="No"). In some embodiments, an update notification may be a trigger that causes the processor executing the MASC client to begin the process of updating a policy file associated with an APN and a subscription. For example, an update notification may be a UDP message/ datagram or an SMS message. In some embodiments, the processor executing the MASC client may receive the update notification at any time. For example, the processor executing the MASC client may receive the update notification before a policy refresh timer expires, as described (see, e.g., FIGS. 14A-14B).

In response to determining that an update notification has been received from an MASC policy server (i.e., determination block 1504="Yes"), the processor executing the MASC client may continue performing the operation of block 1302 of the method 1300 (see FIG. 13) by attempting to establish a connection with the APN. In other words, in response to receiving the policy update notification (e.g., a UDP datagram or an SMS message), the processor executing the MASC client may update the policy file related to the update notification by performing the operations discussed with reference to the method 1300.

With reference to the method 1510, the multi-SIM computing device may be a multi-SIM-multi-standby device. In such some embodiments, the processor executing the MASC client may reallocate shared RF resources in order to update policy files for one subscription while another subscription is using the shared RF resource. In other words, the processor executing the MASC client may manage each of the multiple subscriptions' access to the shared RF resource to update policy files, as described (see, e.g., FIG. 14B).

In block 1502, the processor executing the MASC client may listen on a configured UDP port or an SMS port for an update notification from an MASC policy server in an APN, and may continue listening on the configured UDP port until the processor executing the MASC client determines that an update notification has been received (i.e., while determination block 1504="No"). As described, in some embodiments, the MASC client may receive the update notification (e.g., via a UDP datagram or SMS message) at any time. For example, the MASC client may receive the update notification before a policy refresh timer expires, as described (see e.g., FIG. 14B).

In response to determining that an update notification has been received from an MASC policy server in an APN (i.e., determination block 1504="Yes"), the processor executing the MASC client may identify the subscription associated with the update notification, in block 1512. In some embodiments, the update notification may include the identity of the intended recipient subscription. In some embodiments, the processor executing the MASC client may maintain a mapping (e.g., in a data table) that associated APNs and subscriptions, thereby enabling the MASC client to identify the subscription based on the identity of the APN that sent the update notification.

In determination block 1514, the processor executing the MASC client may determine whether the identified subscription currently has access to a shared RF resource. In some embodiments, because the RF resource is shared among multiple subscriptions on a multi-SIM-multi-standby device, the processor executing the MASC client may need to determine whether the identified subscription has access to the shared RF resource as the identified subscription may need to have access to the shared RF resource in order to update its policy file.

In response to determining that the identified subscription currently has access to the shared RF resource (i.e., determination block 1514="Yes"), the processor executing the MASC client may update the policy for the identified subscription in block 1518b. In response to determining that the identified subscription does not currently have access to the shared RF resource (i.e., determination block 1514="No"), the processor executing the MASC client may provide access to the shared RF resource to the identified subscription, in block 1516. In some embodiments of the operations performed in block 1516, the processor executing the MASC client may remove access to the shared RF resource from another subscription and provide access to the RF resource to the identified subscription. In some embodiments (not shown), the processor executing the MASC client may first determine whether the subscription with current access to the shared RF resource is actively using the shared RF resource (e.g., on a voice or data call), and the processor may provide access to the shared RF resource to the identified subscription in the event that the other subscription is no longer on an active call.

In block 1518a, the processor executing the MASC client may update the policy file for the identified subscription, such as by performing operations similar to those described with reference to block 1518b or those operations described with reference to the method 1300 (see FIG. 13).

In block 1520, the processor executing the MASC client may return the shared RF resource to the other subscription.

After updating the policy file for the identified subscription in block 1518b or returning the shared RF resource to the other subscription in block 1520, the processor executing the MASC client may repeat the above operations in a loop in block 1502 by again monitoring the UDP port or the SMS port for another update notification.

FIG. 16 illustrates a method 1600 for managing policy file updates for an MASC activated subscription on a multi-SIM-multi-standby computing device. The method 1600 may be implemented with a processor (e.g., the general processor 206 or the baseband modem processor 216 of FIG. 2, the modem processor 401 of FIG. 4, a separate controller, and/or the like) executing an MASC client on a multi-SIM-multi-standby computing device (e.g., the multi-SIM computing devices 110, 120, 200, 400 described with reference to FIGS. 1-4, 6, 9, 12). The operations of the method 1600 implement some embodiments of the operations of the method 500 described with reference to FIG. 5. Thus, with reference to FIGS. 1-16, the processor executing the MASC client may begin performing the operations of method 1600 after activating a subscription in block 502 of the method 500. In some embodiments, the processor executing the MASC client may perform the method 500 at the same time as the processor executing the MASC client obtains and updates the activated subscription's policy file(s) in the method 1600.

In some embodiments, the process of obtaining policy file updates for an activated subscription may be interrupted in the event that the activated subscription loses access to the shared RF resource on the multi-SIM-multi-standby computing device because the activated subscription cannot communicate with its network until it regains access to the shared RF resource.

Thus, in block 1601, the process executing the MASC client may monitor the activated subscription's access to the shared RF resource, and may determine whether the activated subscription has lost access to the shared RF resource, in determination block 1602. In response to determining that the activated subscription has not lost access to the shared RF resource (i.e., determination block 1602="No"), the processor executing the MASC client may continue operations to update the activated subscription's policy file in block 1606.

In response to determining that the activated subscription has lost access to the shared RF resource (i.e., determination block 1602="Yes"), the processor executing the MASC client may save the current state of the activated subscription's policy updating operations in block 1604. For example, the processor executing the MASC client may have successfully established a connection to one of the activated subscription's APNs to download a policy file, but the processor executing the MASC client may detect that the user switched from the activated subscription to another subscription before the download could occur. In such an event, the processor executing the MASC client may note/record the extent of the activated subscription's policy file acquisition/update process.

In block 1607, the processor executing the MASC client may again monitor the activated subscription's access to the shared RF resource, and may continue monitoring the activated subscription's access to the shared RF resource until determining that the activated subscription has reacquired the shared RF resource (i.e., while determination block 1608="No").

In response to determining that the activated subscription has reacquired the shared RF resource (i.e., determination block 1608="Yes"), the processor executing the MASC client may resume operations to obtain/update the activated subscription's policy from the saved state in block 1610. In some embodiments of the operations performed in block 1610, the processor executing the MASC client may resume at the point in which the processor executing the MASC client established a connection with one of the activated subscription's APNs.

The processor executing the MASC client may perform the above operations in a loop in block 1601 by again monitoring the activated subscription's access to the shared RF resource to determine whether the activated subscription has lost access to the shared RF resource in determination block 1602.

In some embodiments of the operations performed in the method 1600, the processor executing the MASC client may individually perform method 1600 for each MASC activated subscription operating on the multi-SIM-multi-standby computing device. For example, the processor executing the MASC client may save the current state of a first activated subscription, switch to a second activated subscription, and resume updating the second activated subscription's policy file from the second subscription's saved state.

Figure 17:
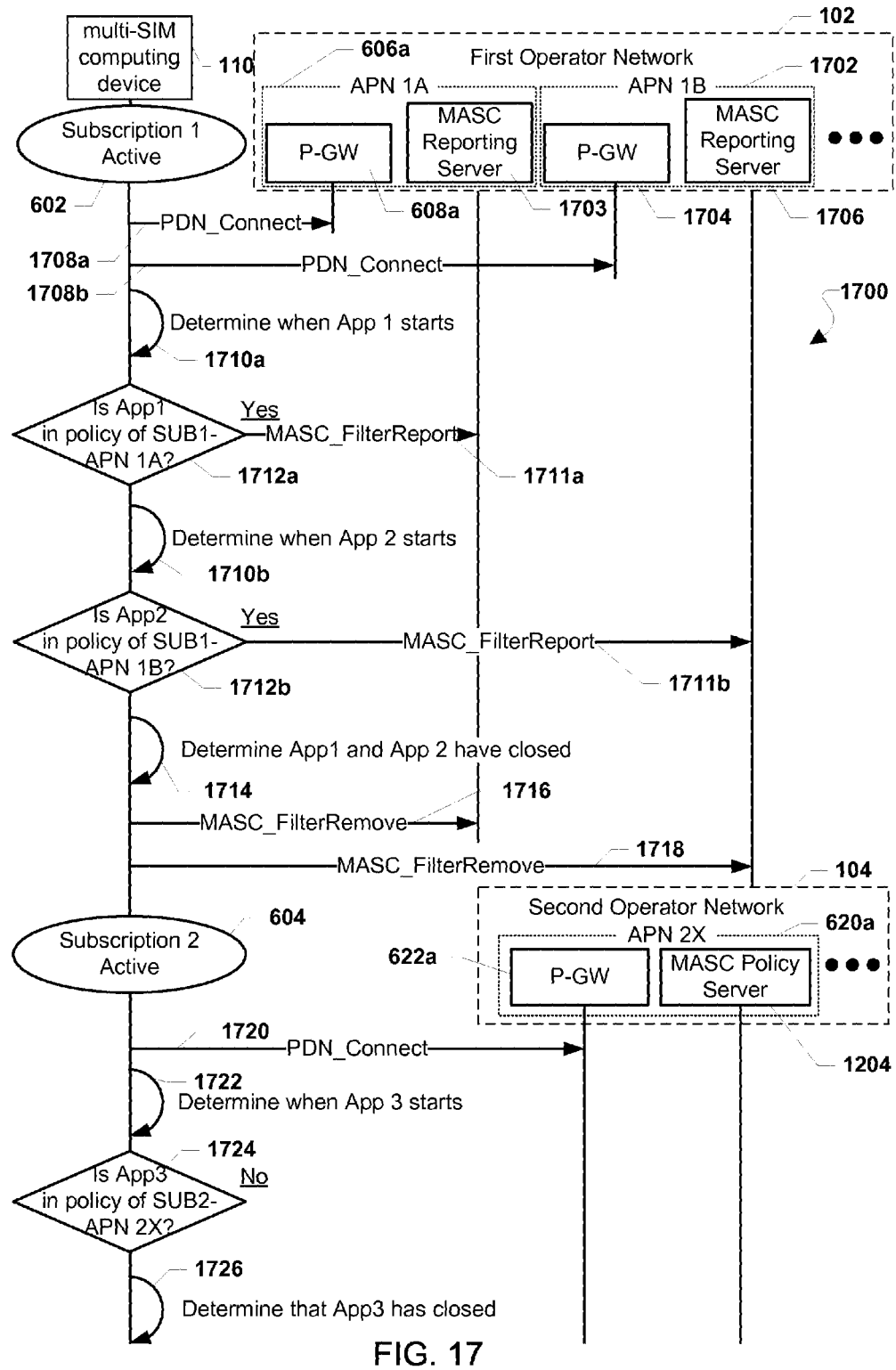
FIG. 17 is a signaling and call flow diagram illustrating communications between an MASC client operating on a multi-SIM computing device and operator networks for implementing MASC functionality when an application launches according to various embodiments.

FIG. 17 is a signaling and call flow diagram 1700 illustrating communications exchanged between a multi-SIM computing device (e.g., the multi-SIM computing device 110 of FIG. 1) executing an MASC client and MASC reporting servers (e.g., MASC-reporting servers 1703, 1706) in operator networks associated with different subscriptions on the multi-SIM computing device 110 (e.g., the operator networks 102, 104 of FIG. 1) for reporting applications launched on the multi-SIM computing device.

With reference to FIGS. 1-17, the multi-SIM computing device 110 may be in communication with one or more APNs in an operator network associated with a subscription (e.g., the first subscription 602 or the second subscription 604) currently active on the multi-SIM computing device. For example, when the first subscription 602 is active, the multi-SIM computing device 110 executing the MASC client may establish a connection with the APN 1A 606*a* in the first operator network 102 (i.e., the operator network of the first subscription 602) through a PDN connection signal 1708*a* sent to the PDN gateway 608*a* in APN 1A 606*a*.

The MASC client application may perform similar operations to establish a connection to a second APN in the subscription's network. For example, the multi-SIM computing device 110 executing the MASC client may also send a PDN connection signal 1708*b* to a PDN gateway 1704 in APN 1B 1702. In another example, in the event that the second subscription 604 is active (which may be at the same or a different time as the first subscription 602, depending on whether the multi-SIM computing device 110 is a multi-SIM-multi-active computing device or multi-SIM-multi-standby computing device), the processor of the multi-SIM computing device 110 executing the MASC client may send a PDN connection signal 1720 to the PDN gateway 622*a* in the APN 2X 602*b*, which may be included in the second operator network 104 associated with the second subscription 604.

In some embodiments, the processor of the multi-SIM computing device 110 executing the MASC client may determine when an application launches. For example, in the event that the first subscription 602 is active, the multi-SIM computing device 110 executing the MASC client may determine that a first application and a second application have started, in operations 1710*a*, 1710*b*, respectively, and that the first and second applications are attempting to connect to the APN 1A 606*a* and the APN 1B 606*b* in the first operator network 102.

In some embodiments, in response to determining that that an application has launched, the multi-SIM computing device 110 executing the MASC client may determine whether the launched application is within a policy file for an APN associated with a currently active subscription. In other words, the processor of the multi-SIM computing device 110 executing the MASC client may determine whether a policy file for the APN associated with the currently active subscription and the launched application includes the identity of the launched application. For example, the processor executing the MASC client may determine whether a first application (e.g., which is associated with APN 1A 606*a*) is in the policy file for the APN 1A 606*a*, in determination operation 1712*a*. The processor executing the MASC client may make a similar determination for the second application associated with the APN 1B 606*b*, in determination operation 1712*b*. In another example, after a third application launches while subscription 2 604 (which is associated with APN2X 620*a*) is active, the processor executing the MASC client may determine whether the third application (which is associated with the APN 2X 620*a*) is in the policy file for the APN 2X 620*a*.

In some embodiments, in response to determining that a launched application of a currently active subscription is in the policy file for the launched application's associated APN, the multi-SIM computing device 110 may send an MASC filter report to an MASC reporting server in the launched application's associated APN. For example, in response to determining that the first and second applications are in policy files for their respective APNs 606*a*-606*b* (i.e., determination operations 1712*a*-1712*b*="Yes"), the multi-SIM computing device 110 may send MASC filter reports 1711*a*, 1711*b* to MASC-reporting servers 1703, 1706. In some embodiments, an MASC filter report may include any combination of the following: the application's name, a hash value of the application, protocol information, an IP destination address, an IP destination port, an IP source address, an IP source port (depending on whether using TCP or UDP send/listen), etc.

On the other hand, in response to determining that an application is not in the policy file for its associated APN, the multi-SIM computing device 110 may ignore the application launch and may not send a reporting signal to an MASC reporting server in the application's APN. For example, in response to determining that the third application is not in the policy file of the APN 2X 620*a* (i.e., determination operation 1724="No"), the processor executing the MASC client may perform no further operations, which may prevent the third application from receiving network resources.

In some embodiments, the processor of the multi-SIM computing device 110 executing the MASC client may determine when an application closes. For example, the processor executing the MASC client may determine that the first and second application and the third applications have closed in operations 1714, 1726, respectively. In some embodiments, the processor executing the MASC client may send an MASC-filter-remove request for terminated applications that were previously reported to an MASC reporting server. For example, because the processor executing the MASC client previously sent the MASC-reporting servers 1703, 1706 filter information for those applications, the processor may send MASC-filter-remove requests 1716, 1718 to the MASC-reporting servers 1703, 1706. In some embodiments, the processor executing the MASC client may not send an MASC filter remove request when a terminated application was not previously reported an MASC-reporting server, for example, in response to determining that the third application has terminated in operation 1726.

Figure 18:
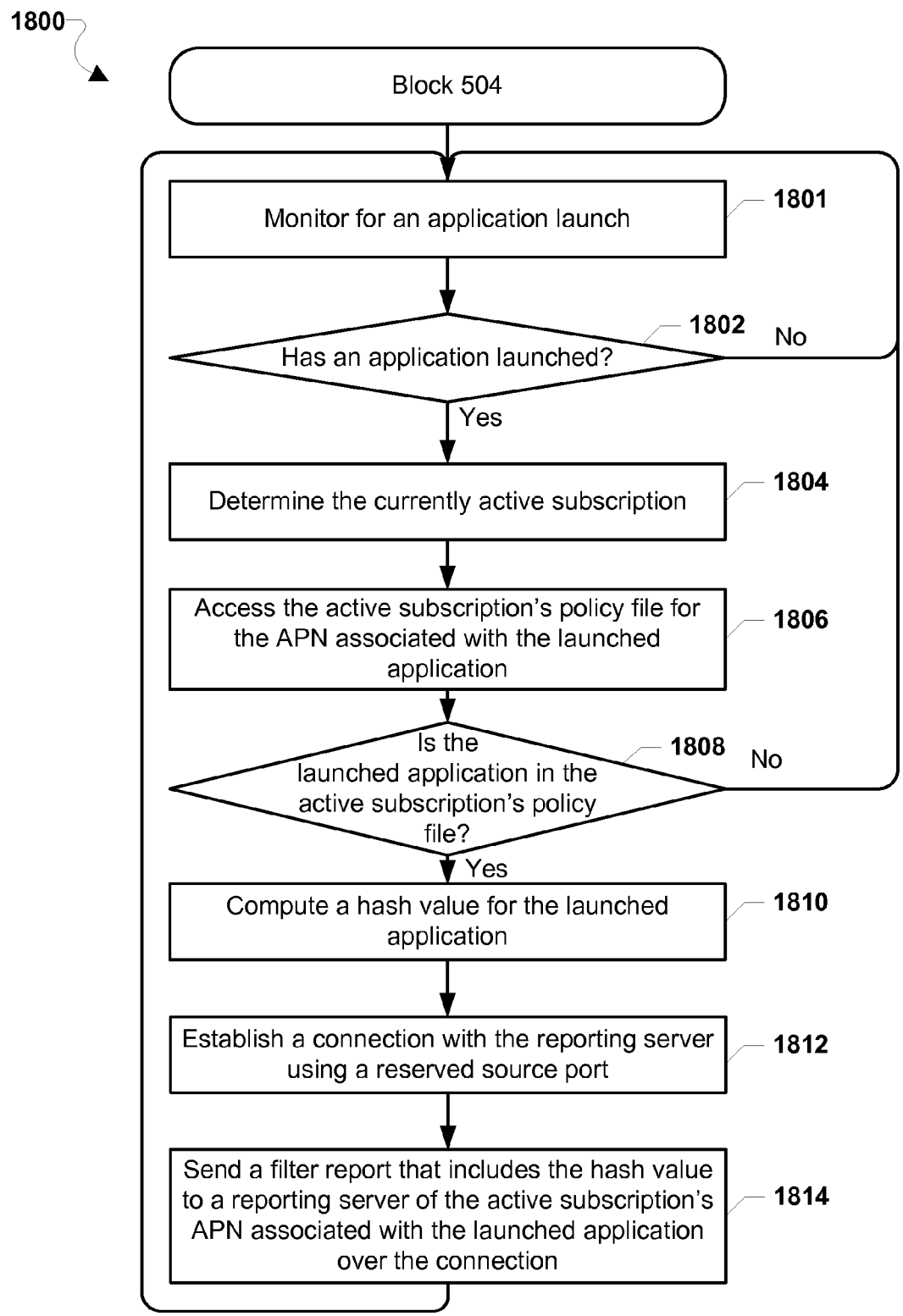
FIG. 18 is a process flow diagram illustrating a method of implementing MASC functionality for a subscription on a multi-SIM computing device when an application launches according to various embodiments.

FIG. 18 illustrates a method 1800 for implementing MASC functionality when an application is launched on the multi-SIM computing device. The method 1800 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9, 12, 17). The operations of the method 1800 implement some embodiments of the operations of blocks 506, 508, and 510 of method 500 described with reference to FIG. 5. Thus, with reference to FIGS. 1-18, the processor executing the MASC client may perform the operations of the method 1800 in response to obtaining a policy file from a subscription's network for each of one or more APNs, in block 504 of the method 500.

In block 1801, the processor executing the MASC client may monitor for an application, and may continue monitoring for an application launch until determining that an application has launched in determination block 1802 (i.e., while determination block 1802="No"). For example, the processor executing the MASC client may determine the application status, detect a flag indicative of the application status, or receive a signal from another processor on the multi-SIM computing device whenever an application is launched.

In response to determining that an application has launched (i.e., determination block 1802="Yes"), the processor executing the MASC client may determine the currently active subscription in block 1804. In some embodiments, the currently active subscription may be a subscription with access to a shared RF resource (e.g., when the multi-SIM computing device is a multi-SIM-multi-standby computing device). In some embodiments, there may be more than one currently active subscription (e.g., when the multi-SIM computing device is a multi-SIM-multi-active computing device).

In block 1806, the processor executing the MASC client may access the determined active subscription's policy file for the APN associated with the launched application. In some embodiments, each application may be associated with a particular APN, and for each MASC-activated subscription, the processor executing the MASC client may maintain a mapping of the APN that is associated with each application on the multi-SIM computing device. For example, the processor executing the MASC client may record that, for a particular subscription, an email client is associated with a particular message-related APN.

In determination block 1808, the processor executing the MASC client may determine whether the launched application is in the active subscription's policy file. In some embodiments in which the multi-SIM computing device is a multi-SIM-multi-active computing device, the processor executing the MASC client may determine whether the launched application is in any active subscription's policy file.

In response to determining that the launched application is not in the active subscription's policy file (i.e., determination block 1808="No"), the processor may again monitor whether another application has launched, in block 1801. In other words, in the event that the launched application is not in the active subscription's policy file for the APN associated with the launched application, the processor executing the MASC client may, in essence, ignore the launched application because the launched application does not have authorization to access network resources.

In response to determining that the launched application is in the active subscription's policy file (i.e., determination block 1808="Yes"), the processor executing the MASC client may compute a hash value for the launched application in block 1810. In block 1812, the processor executing the MASC client may establish a connection with the reporting server using a reserved source port. In some embodiments, the connection may be any one of an HTTP connection, an HTTPS connection, an FTP connection, a TFTP connection, a TCP connection, a UDP connection, or various other protocols any other protocol that may be used to download a file.

In block 1814, the processor executing the MASC client may send a filter report including the hash value to a reporting server of the active subscription's APN associated with the launched application over the TCP connection, as described (see, e.g., FIG. 16). The processor executing the MASC client may repeat the above operations in a loop in block 1801 by again monitoring for an application launch.

Figure 19:
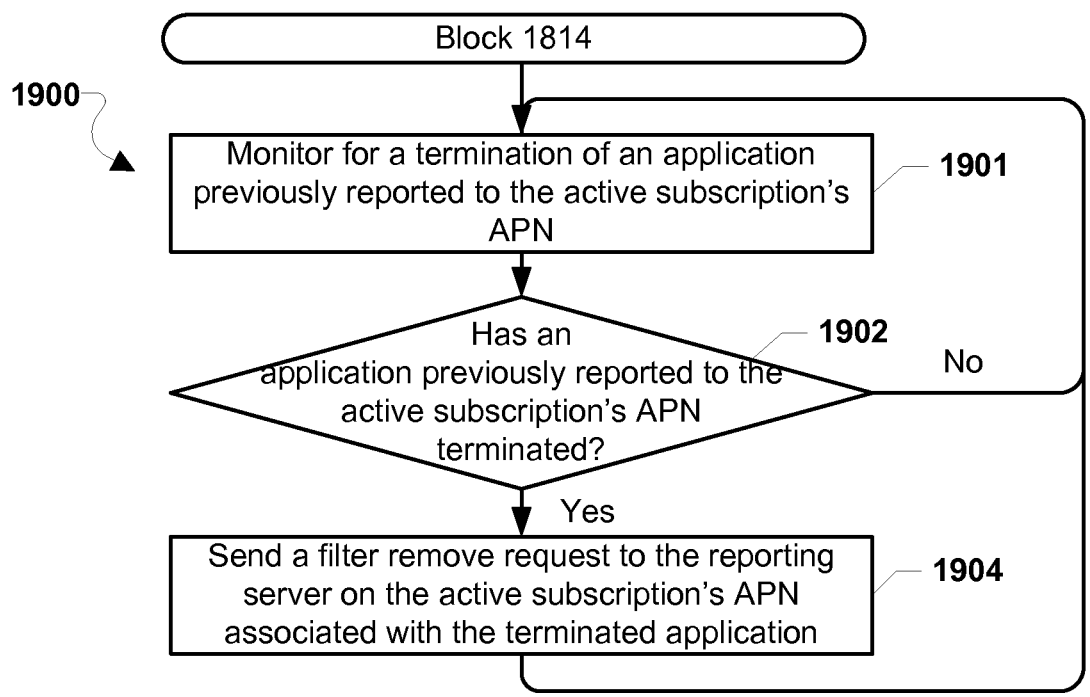
FIG. 19 is a process flow diagram illustrating a method of reporting a terminated application to an APN according to various embodiments.

FIG. 19 illustrates a method 1900 for updating an MASC reporting server when an application terminates on the multi-SIM computing device. The method 1900 may be implemented with a processor (e.g., the general processor 206 or the baseband modem processor 216 of FIG. 2, the modem processor 401 of FIG. 4, a separate controller, and/or the like) executing an MASC client on a multi-SIM computing device (e.g., the multi-SIM computing devices 110, 120, 200, 400 described with reference to FIGS. 1-4, 6, 9, 12, 17). The operations of the method 1900 implement some embodiments of the operations of the method 1800 described with reference to FIG. 18. Thus, with reference to FIGS. 1-19, the processor executing the MASC client may perform the operations of the method 1900 in response to sending a filter report to a reporting server in block 1814 of the method 1800 (see FIG. 18).

In block 1901, the processor executing the MASC client may monitor for a termination of an application previously reported to the active subscription's APN, and may continue monitoring in block 1901 until determining (determination block 1902) an application previously reported to the active subscription's APN has terminated (i.e., while determination block 1902="No"). In some embodiments, the terminating application, a processor, or another component operating on the multi-SIM computing device may alert the processor executing the MASC client of the application's termination.

In response to determining that an application that has been previously reported to the active subscription's APN has terminated (i.e., determination block 1902="Yes"), the processor executing the MASC client may send a filter remove request to the reporting server of the active subscription's APN associated with the terminated application, in block 1904.

The processor executing the APN client may perform the above operations in a loop in block 1901 by again monitoring for a termination of an application previously reported to the active subscription's APN.

Figure 20:
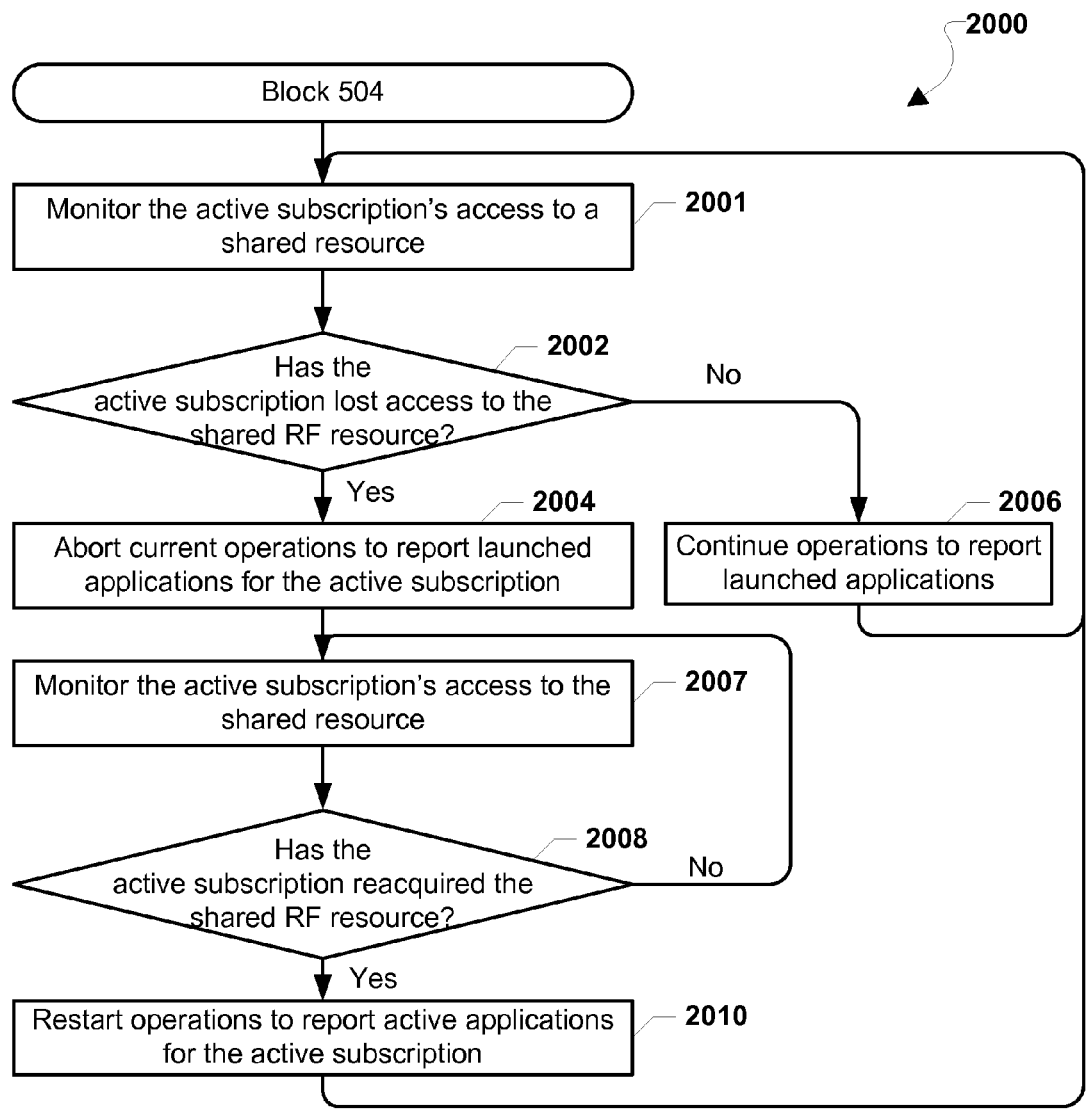
FIG. 20 is a process flow diagram illustrating a method of managing the implementation of MASC functionality for a subscription operating on a multi-SIM-multi-standby computing device according to various embodiments.

FIG. 20 illustrates a method 2000 for managing implementation of MASC functionality for an active subscription on a multi-SIM-multi-standby computing device. The method 2000 may be implemented with a processor (e.g., the general processor 206 or the baseband modem processor 216 of FIG. 2, the modem processor 401 of FIG. 4, a separate controller, and/or the like) executing an MASC client on a multi-SIM-multi-standby computing device (e.g., the multi-SIM computing devices 110, 120, 200, 400 described with reference to FIGS. 1-4, 6, 9, 12, 17). The operations of the method 2000 implement some embodiments of the operations of the method 500 described with reference to FIG. 5. Thus, with reference to FIGS. 1-20, the processor executing the MASC client may perform the operations of the method 2000 in response to obtaining a policy file from a subscription's operator network for one or more APNs in block 504 of the method 500 (see FIG. 5).

In some embodiments, the process of reporting launching applications to an active subscription's one or more APNs may be interrupted when the active subscription loses access to the shared RF resource, thereby preventing the active subscription from communicating with (i.e., reporting the launched application to) its network until the active subscription regains access to the shared RF resource.

In block 2001, the processor executing the MASC client may monitor the active subscription's access to a shared resource, such as by identifying the subscription that currently has access to the shared resource. In determination block 2002, the processor executing the MASC client may determine whether the active subscription has lost access to the shared RF resource. In response to determining that the activated subscription has not lost access to the shared RF resource (i.e., determination block 2002="No"), the processor executing the MASC client may continue operations to report launched applications to the active subscription's APNs in block 2006.

In response to determining that the activated subscription has lost access to the shared RF resource (i.e., determination block 2002="Yes"), the MASC client may abort current operations to report launched applications for the active subscription in block 2004. For example, an application may have launched, and another subscription may have received access to the shared RF resource before the processor executing the MASC client could report the launched application to one of the active subscription's APNs. In such an event, the processor executing the MASC client may not save the current state of operations.

In block 2007, the processor executing the MASC client may again monitor the active subscription's access to the shared resources, and may continue monitoring in block 2007 as long as the active subscription has not reacquired the shared RF resource (i.e., while determination block 2008="No"). In response to determining that the active subscription has reacquired the shared RF resource (i.e., determination block 2008="Yes"), the processor executing the MASC client may restart operations to report launched applications in block 2010. In some embodiments, the processor executing the MASC client may restart operations in block 2010 by performing operations similar to those described with reference to the method 1800 (see FIG. 18).

After continuing operations to report launched applications in block 2006 or restarting operations to report active applications for the active subscription in block 2010, the processor executing the MASC client may perform the above operations in a loop in block 2001 by again monitoring the active subscription's access to the shared resource and determining whether the active subscription has lost access to the shared RF resource in determination block 2002.

In some embodiments, the processor executing the MASC client may individually perform the operations of method 2000 for each MASC active subscription operating on the multi-SIM-multi-standby computing device. For example, the processor executing the MASC client may abort the current state of a first active subscription, switch to a second active subscription, and restart application reporting on the second active subscription.

Figure 21:
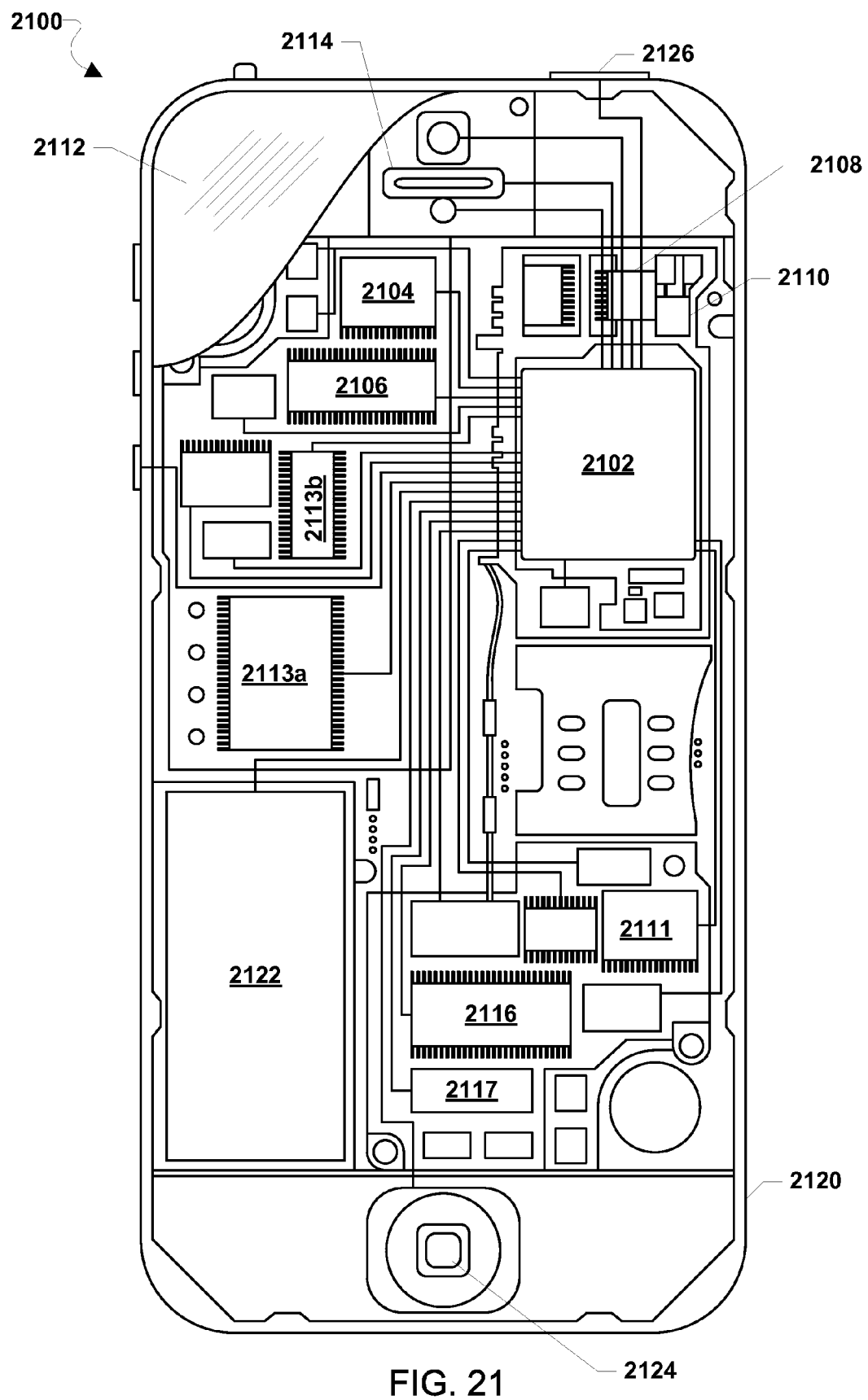
FIG. 21 is a component block diagram of a multi-SIM computing device suitable for implementing some embodiment methods.

Various embodiments may be implemented in any of a variety of multi-SIM computing devices, an example on which (e.g., multi-SIM computing device 2100) is illustrated in FIG. 21. According to various embodiments, the multi-SIM computing device 2100 may be similar to the multi-SIM computing devices 110, 120, 200, 400 as described above with reference to FIGS. 1-4, 6, 9, 12, and 17. As such, the multi-SIM computing device 2100 may implement the methods 500, 700, 800, 1000, 1100, 1300, 1400, 1410, 1500, 1510, 1600, 1800, 1900, and 2000 in FIGS. 5, 7, 8, 10, 11, 13-16, and 18-20.

Thus, with reference to FIGS. 1-21, the multi-SIM computing device 2100 may include a processor 2102 coupled to a touchscreen controller 2104 and an internal memory 2106. The processor 2102 may be one or more multi-core integrated circuits designated for general or specific processing tasks. The internal memory 2106 may be volatile or non-volatile memory, and may also be secure and/or encrypted memory, or unsecure and/or unencrypted memory, or any combination thereof. The touchscreen controller 2104 and the processor 2102 may also be coupled to a touchscreen panel 2112, such as a resistive-sensing touchscreen, capacitive-sensing touchscreen, infrared sensing touchscreen, etc. Additionally, the display of the multi-SIM computing device 2100 need not have touch screen capability.

The multi-SIM computing device 2100 may have one or more cellular network transceivers (e.g., cellular network transceivers 2108, 2116) coupled to the processor 2102 and to one or more antennae (e.g., antennae 2110, 2111) and configured for sending and receiving cellular communications. The transceivers 2108, 2116 and the antennae 2110, 2111 may be used with the above-mentioned circuitry to implement the various embodiment methods. The multi-SIM computing device 2100 may include two or more SIM cards (e.g., SIMs 2113a, 2113b) coupled to the transceivers 2108, 2116 and/or the processor 2102 and configured as described above. The multi-SIM computing device 2100 may include a cellular network wireless modem chip 2117 that enables communication via a cellular network and is coupled to the processor 2102.

The multi-SIM computing device 2100 may also include speakers 2114 for providing audio outputs. The multi-SIM computing device 2100 may also include a housing 2120, constructed of a plastic, metal, or a combination of materials, for containing all or some of the components discussed herein. The multi-SIM computing device 2100 may include a power source 2122 coupled to the processor 2102, such as a disposable or rechargeable battery. The rechargeable battery may also be coupled to the peripheral device connection port to receive a charging current from a source external to the multi-SIM computing device 2100. The multi-SIM computing device 2100 may also include a physical button 2124 for receiving user inputs. The multi-SIM computing device 2100 may also include a power button 2126 for turning the multi-SIM computing device 2100 on and off.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of implementing network access policies for a plurality of subscriptions to one or more operator networks in a multi-Subscriber-Identity-Module (multi-SIM) computing device, comprising:
   receiving, by a hardware processor, a signal from an operator network identifying one of the plurality of subscriptions on which to activate a network access policy for the subscription for an access point name;
   obtaining, by the hardware processor, a policy file for the subscription identified in the signal from the operator network for the access point name, wherein the policy file identifies one or more applications authorized to access network resources of the access point name;
   determining, by the hardware processor, whether an application has launched;
   determining, by the hardware processor, which of the plurality of subscriptions is an active subscription for the launched application;
   accessing, by the hardware processor, the policy file of the active subscription for the access point name associated with the launched application;
   determining, by the hardware processor, whether the launched application is identified in the accessed policy file of the active subscription for the access point name; and
   sending, by the hardware processor, a report to the operator network in response to determining that the launched application is in the accessed policy file of the active subscription for the access point name, wherein the report comprises network address information for detecting network traffic associated with the launched application on the active subscription.

2. The method of claim 1, wherein determining whether an application has launched comprises determining, by the hardware processor, whether an application that exchanges communications over a wireless network has launched.

3. The method of claim 1, wherein receiving a signal from an operator network identifying one of the plurality of subscriptions on which to activate a network access policy for the subscription for an access point name comprises:
   receiving, by the hardware processor, a Short Message Service (SMS) message that identifies the access point name for the subscription from an activation server on the operator network.

4. The method of claim 3, further comprising:
   determining, by the hardware processor, whether the SMS message includes Internet Protocol (IP) information for a server in the identified access point name; and
   acquiring, by the hardware processor, the IP information for the server through a Domain Name System (DNS) query to a DNS server in the identified access point name in response to determining that the SMS message does not include the IP information for the server.

5. The method of claim 1, wherein receiving a signal from an operator network identifying one of the plurality of subscriptions on which to activate a network access policy for the subscription for an access point name comprises:
   opening, by the hardware processor, a user-datagram-protocol (UDP) listening port for the subscription; and
   receiving, by the hardware processor, a UDP packet that identifies the access point name for the subscription from an activation server on the operator network.

6. The method of claim 5, further comprising:
   determining, by the hardware processor, whether the UDP packet includes Internet Protocol (IP) information for a server in the identified access point name; and
   acquiring, by the hardware processor, the IP information through a Domain Name System (UDP) query to a DNS server in the identified access point name in response to determining that the UDP packet does not include IP information for the server.

7. The method of claim 1, wherein obtaining a policy file for the subscription identified in the signal from the operator network for the access point name comprises:
   establishing, by the hardware processor, a connection with a policy-management server in the access point name; and
   receiving, by the hardware processor, the policy file associated with the access point name and the subscription from the policy-management server in the access point name.

8. The method of claim 7, wherein the connection with the policy-management server in the access point name is one of:
   a hypertext-transfer-protocol (HTTP) connection;
   an HTTP-secure connection;
   a file-transfer-protocol (FTP) connection;
   a trivial-file-transfer-protocol (TFTP) connection;
   a transmission-control-protocol (TCP) connection; and
   a UDP connection.

9. The method of claim 7, further comprising:
   starting, by the hardware processor, a policy refresh timer associated with the policy file;
   determining, by the hardware processor, whether to update the policy file; and
   updating, by the hardware processor, the policy file in response to determining that the policy file should be updated.

10. The method of claim 9, further comprising:
    determining, by the hardware processor, that the subscription has lost access to a shared radio-frequency (RF) resource on the multi-SIM computing device, wherein the multi-SIM computing device is a multi-SIM-multi-standby computing device;
    saving, by the hardware processor, a current state of policy-update operations of the subscription in response to recognizing that the subscription has lost access to the shared RF resource;
    determining, by the hardware processor, whether the subscription has reacquired the shared RF resource; and
    resuming, by the hardware processor, policy-update operations of the subscription from the saved state of policy-update operations in response to determining that the subscription has reacquired the shared RF resource.

11. The method of claim 9, wherein:
    determining, by the hardware processor, whether to update the policy file comprises determining whether the policy refresh timer has expired; and
    updating, by the hardware processor, the policy file in response to determining that the policy file should be updated comprises updating the policy file in response to determining that the policy refresh timer has expired.

12. The method of claim 9, wherein updating the policy file in response to determining that the policy file should be updated comprises:
    determining, by the hardware processor, whether the subscription has access to a shared radio-frequency (RF) resource on the multi-SIM computing device, wherein the multi-SIM computing device is a multi-SIM-multi-standby computing device;
    providing, by the hardware processor, access to the shared RF resource to the subscription in response to determining that the subscription does not have access to the shared RF resource;
    updating, by the hardware processor, the policy file; and
    returning, by the hardware processor, access to the shared RF resource to another subscription after updating the policy file.

13. The method of claim 9, wherein the multi-SIM computing device is a multi-SIM-multi-active computing device such that each subscription on the multi-SIM computing device has access to an RF resource for use in updating policy files.

14. The method of claim 9, wherein determining whether to update the policy file comprises determining, by the hardware processor, whether an update notification has been received from a policy management server in the access point name by listening on one of a UDP port and an SMS port.

15. The method of claim 14, wherein updating the policy file in response to determining that the policy file should be updated further comprises:
    determining, by the hardware processor, whether the subscription has access to a shared radio-frequency (RF) resource on the multi-SIM computing device in response to determining that an update notification has been received from a policy management server in the access point name, wherein the multi-SIM computing device is a multi-SIM-multi-standby computing device;
    providing, by the hardware processor, access to the shared RF resource to the subscription in response to determining that the subscription does not have access to the shared RF resource;
    updating, by the hardware processor, the policy file; and
    returning, by the hardware processor, access to the shared RF resource to another subscription after updating the policy file.

16. The method of claim 1, wherein sending a report to the operator network in response to determining that the launched application is in the policy file of the access point name comprises:
    computing, by the hardware processor, a filter report comprising one or more of the launched application's source and destination IP addresses, the launched application's source and destination ports, and a protocol used by the application and computing a hash value for the launched application, in response to determining that the launched application is in a policy file of an access point name associated with the active subscription;
    establishing, by the hardware processor, a connection with a reporting server in the access point name for the active subscription; and sending, by the hardware processor, a report that includes the filter report and the hash value to the reporting server in the access point name of the active subscription over the connection.

17. The method of claim 16, wherein the connection with the reporting server in the access point name for the active subscription is one of:
an HTTP connection;
an HTTP-secure connection;
an FTP connection;
a TFTP connection;
a TCP connection; and
a UDP connection.

18. The method of claim 16, further comprising:
determining, by the hardware processor, whether the launched application has terminated; and
notifying, by the hardware processor, the reporting server in the access point name of the active subscription of the termination of the launched application in response to determining that the launched application has terminated.

19. The method of claim 1, further comprising:
determining, by the hardware processor, whether the subscription has lost access to a shared radiofrequency (RF) resource on the multi-SIM computing device, wherein the multi-SIM computing device is a multi-SIM-multi-standby computing device;
aborting, by the hardware processor, operations to report launched applications to the operator network of the subscription in response to determining that the subscription has lost access to the shared RF resource;
determining, by the hardware processor, whether the subscription has reacquired the shared RF resource; and
restarting, by the hardware processor, operations to report launched applications to the operator network of the subscription in response to determining that the subscription has reacquired the shared RF resource.

20. The method of claim 1, wherein the multi-SIM computing device is a multi-SIM-multi-active computing device such that each subscription on the multi-SIM computing device has access to an RF resource for use in sending a report to the operator network.

21. A mobile computing device that implements network access policies for a plurality of subscriptions to one or more operator networks, comprising:
a radio-frequency (RF) resource; and
a hardware processor coupled to the RF resource, wherein the processor is configured to:
receive a signal from an operator network identifying one of the plurality of subscriptions on which to activate a network access policy for a subscription for an access point name;
obtain a policy file for the subscription identified in the signal from the operator network for the access point name, wherein the policy file identifies one or more applications authorized to access network resources of the access point name;
determine whether an application has launched;
determine which of the plurality of subscriptions is an active subscription for the launched application;
access the policy file of the active subscription for the access point name associated with the launched application;
determine whether the launched application is identified in the accessed policy file of the active subscription for the access point name; and send a report to the operator network in response to determining that the launched application is in the accessed policy file of the active subscription for the access point name, wherein the report comprises network address information for detecting network traffic associated with the launched application on the active subscription.

22. The mobile computing device of claim 21, wherein the hardware processor is further configured to:
receive a Short Message Service (SMS) message that identifies the access point name for the subscription from an activation server on the operator network.

23. The mobile computing device of claim 21, wherein the hardware processor is further configured to:
open a user-datagram-protocol (UDP) listening port for the subscription; and
receive a UDP packet for the subscription from an activation server on the operator network.

24. The mobile computing device of claim 21, wherein the hardware processor is further configured to:
establish a connection with a policy-management server in the access point name; and
receive the policy file associated with the access point name and the subscription from the policy-management server in the access point name.

25. The mobile computing device of claim 24, wherein the hardware processor is further configured to:
start a policy refresh timer associated with the policy file;
determine whether to update the policy file; and
update the policy file in response to determining that the policy file should be updated.

26. The mobile computing device of claim 21, wherein the hardware processor is further configured to:
compute a filter report comprising one or more of the launched application's source and destination IP addresses, the launched application's source and destination ports, and a protocol used by the application and compute a hash value for the launched application, in response to determining that the launched application is in a policy file of an access point name associated with the active subscription;
establish a connection with a reporting server in the access point name for the active subscription; and
send a report that includes the filter report and the hash value to the reporting server in the access point name of the active subscription over the connection.

27. The mobile computing device of claim 21, wherein the hardware processor is further configured to:
determine whether the subscription has lost access to the RF resource on the mobile computing device, wherein the mobile computing device is a multi-SIM-multi-standby computing device and wherein the RF resource is shared by the subscription and at least one other subscription;
abort operations to report launched applications to the operator network of the subscription in response to determining that the subscription has lost access to the RF resource;
determine whether the subscription has reacquired the RF resource; and
restart operations to report launched applications to the operator network of the subscription in response to determining that the subscription has reacquired the RF resource.

28. The mobile computing device of claim 21, wherein:
the RF resource comprises a plurality of RF resources; and the mobile computing device is a multi-SIM-multi-active computing device such that each subscription on the mobile computing device has access to an RF resource for use in sending a report to the operator network.

29. A non-transitory processor-readable storage medium having stored thereon processor-executable instructions configured to cause a processor of a multi-Subscriber-Identity-Module (multi-SIM) computing device to perform operations for implementing network access policies for a plurality of subscriptions to one or more operator networks, the operations comprising:

receiving a signal from an operator network identifying one of the plurality of subscriptions on which to activate a network access policy for the subscription for an access point name;

obtaining a policy file for the subscription identified in the signal from the operator network for the access point name, wherein the policy file identifies one or more applications authorized to access network resources of the access point name;

determining whether an application has launched;

determining which of the plurality of subscriptions is an active subscription for the launched application;

accessing the policy file of the active subscription for the access point name associated with the launched application;

determining whether the launched application is identified in the accessed policy file of the active subscription for the access point name; and sending a report to the operator network in response to determining that the launched application is in the accessed policy file of the active subscription for the access point name, wherein the report comprises network address information for detecting network traffic associated with the launched application on the active subscription.

30. A mobile computing device that implements network access policies for a plurality of subscriptions to one or more operator networks, comprising:

means for receiving a signal from an operator network identifying one of the plurality of subscriptions on which to activate a network access policy for the subscription for an access point name;

means for obtaining a policy file for the subscription identified in the signal from the operator network for the access point name, wherein the policy file identifies one or more applications authorized to access network resources of the access point name;

means for determining whether an application has launched;

means for determining which of the plurality of subscriptions is an active subscription for the launched application;

means for accessing the policy file of the active subscription for the access point name associated with the launched application;

means for determining whether the launched application is identified in the accessed policy file of the active subscription for the access point name; and means for sending a report to the operator network in response to determining that the launched application is in the accessed policy file of the active subscription for the access point name, wherein the report comprises network address information for detecting network traffic associated with the launched application on the active subscription.

* * * * *